(12) United States Patent
Hewitt et al.

(10) Patent No.: US 9,381,693 B2
(45) Date of Patent: Jul. 5, 2016

(54) PACKAGING AND LABELLING FILMS

(71) Applicant: INNOVIA FILMS LIMITED, Wigton, Cumbria (GB)

(72) Inventors: Jonathan C. E. Hewitt, Wigton (GB); Christopher S. Konkel, Wigton (GB)

(73) Assignee: INNOVIA FILMS LIMITED, Wigton, Cumbria (GB)

( * ) Notice: Subject to any disclaimer, the term of this patent is extended or adjusted under 35 U.S.C. 154(b) by 0 days.

(21) Appl. No.: 14/647,784

(22) PCT Filed: Dec. 23, 2013

(86) PCT No.: PCT/GB2013/053426
§ 371 (c)(1),
(2) Date: May 27, 2015

(87) PCT Pub. No.: WO2014/102544
PCT Pub. Date: Jul. 3, 2014

(65) Prior Publication Data
US 2015/0290859 A1      Oct. 15, 2015

(30) Foreign Application Priority Data
Dec. 24, 2012  (GB) .................................. 1223376.3

(51) Int. Cl.
| C08G 63/91 | (2006.01) |
| B29C 47/00 | (2006.01) |
| C08J 5/18  | (2006.01) |
| B29C 55/12 | (2006.01) |
| B29C 55/16 | (2006.01) |
| B29C 47/88 | (2006.01) |
| C08L 67/00 | (2006.01) |
| B29K 67/00 | (2006.01) |
| B29L 31/00 | (2006.01) |

(52) U.S. Cl.
CPC .......... B29C 47/0057 (2013.01); B29C 47/8845 (2013.01); B29C 55/12 (2013.01); B29C 55/16 (2013.01); C08J 5/18 (2013.01); *B29K 2067/046* (2013.01); *B29L 2031/744* (2013.01); *C08J 2367/04* (2013.01); *C08J 2467/04* (2013.01)

(58) Field of Classification Search
CPC .................................. C08G 69/26; C08J 5/18
USPC .................. 525/415; 528/271, 272, 354, 361; 428/343
See application file for complete search history.

(56) References Cited

U.S. PATENT DOCUMENTS

| 7,615,183 B2 | 11/2009 | Tweed et al. |
| 7,670,545 B2 | 3/2010  | Bopp et al. |
| 7,993,745 B2 | 8/2011  | Narita et al. |
| 8,263,197 B2 | 9/2012  | Tweed et al. |
| 2003/0038405 A1 | 2/2003 | Bopp et al. |

FOREIGN PATENT DOCUMENTS

| EP | 1 609 819 A1 | 12/2005 |
| EP | 1 867 679 A1 | 12/2007 |
| EP | 2 025 703 A1 | 2/2009 |
| EP | 2 330 148 A1 | 6/2011 |
| EP | 1 735 373 B1 | 2/2012 |
| EP | 2 469 618 A1 | 6/2012 |
| JP | 55-157408 | 8/1980 |
| JP | 8-73628 | 3/1996 |
| JP | 2003103628 A | 4/2003 |
| JP | 2007119553 A | 5/2007 |
| JP | 2008248162 A | 10/2008 |
| JP | 2009249583 A | 10/2009 |
| WO | 92/04413 A1 | 3/1992 |
| WO | 2008/057214 A2 | 5/2008 |

OTHER PUBLICATIONS

International Search Report of International Application No. PCT/GB2013/053426 mailed Oct. 17, 2014.

*Primary Examiner* — Terressa Boykin
(74) *Attorney, Agent, or Firm* — Ping Wang; Andrews Kurth LLP

(57) ABSTRACT

The present invention provides a transparent, dimensionally stable, biaxially oriented PLA film having a haze value of less than 3% and exhibiting strain induced crystallinity having been oriented by stretching the film from a substantially non-crystalline state by more than three times its original areal dimensions. The processes for making such films are also disclosed.

36 Claims, 11 Drawing Sheets

PACKAGING AND LABELLING FILMS

This application is a national stage application of International Patent Application No. PCT/GB2013/053426, filed Dec. 23, 2013, which claims priority to United Kingdom Patent Application No. 1223376.3, filed Dec. 24, 2012. The entirety of the aforementioned applications is incorporated herein by reference.

FIELD

The present invention concerns polymeric packaging and labelling films and methods for their production and use. In particular, the invention concerns oriented polylactic acid (OPLA) and biaxially oriented polylactic acid (BOPLA) films.

Polylactic acid (PLA), also known as polylactide, is a biopolymer which derives from lactic acid or lactide occurring in two enantiomeric forms, D and L. Polymers derived from the pure L form may be designated as PLLA and polymers derived from the pure D form may be designated PDLA. Polymers derived from mixed D and L monomeric sources may be designated as PDLLA. It has only recently become commercially feasible to manufacture optically pure PLLA and PDLA.

Currently, most commercially available BOPLA films are manufactured from maize starch and are copolymers of L- and D-lactic acid and/or meso lactide. The ratio of the two polymers affects amongst other things the melting point and the degree of crystallinity of the films. The melting point may vary from around 150° C. to around 170° C., depending on the ratio of PLLA to PDLA. By way of comparison, the melting point of optically pure PLLA and PDLA is approximately 180° C.

Optically pure PLLA and PDLA can crystallise rapidly with a relatively high degree of crystallinity. The melting point of an optically pure polymer, its crystallisation rate, and its degree of crystallinity can all be altered or controlled by blending in its opposite enantiomer—e.g. by blending in an amount of PDLA with PLLA; or vice versa.

Another feature of PDLA and PLLA enantiomers is that when blended together they can be made to form a stereocomplex, thought to be possible because the two opposing helical structures are able to mesh together. The stereo-complex form has a significantly higher melting point (ca. 230° C.) than the pure forms or the copolymeric forms previously referred to herein.

WO2008057214 discloses a method of producing a PLA film wherein the PLA resin (a mixture of "high-PLLA" and "high-PDLA") is heated to a temperature between the glass transition temperature of the PLA resin and the highest crystalline melting temperature of the PLA resin, followed by thermoforming the heated sheet on a mold to form a thermoformed article.

EP1867679 and U.S. Pat. No. 7,993,745 disclose methods of producing a PLA film by kneading certain proportions of PLLA and PDLA at temperatures of between 230° C. and 260° C., at least uniaxially stretching the film and then heat treating at a temperature between 140 and 220° C. for 1 second or longer.

EP2330148 discloses a PLA film which is prepared from a mixture of PLLA and PDLA (each component may include some of the other component), obtained by melt kneading at temperatures between 220 and 200° C., stretching the film and then treating the film at a temperature between 90 and 210° C.

EP1609819 discloses a resin composition containing poly (lactic acid) and a cellulosic ester. The resin composition is obtained by melt-kneading a poly(lactic acid) polymer with a weight average molecular weight of 50,000 or higher and a cellulosic ester.

EP 2469618 discloses a piezoelectric polymer material comprising a helical chiral polymer having a weight average molecular weight of from 50,000 to 1,000,000 and optical activity. The piezoelectric polymer material having crystallinity as obtained by a DSC method of from 40% to 80%; a transmission haze with respect to visible light of from 0% to 40%; a standardized molecular orientation of from 3.5 to 15.0 and a product of the crystallinity and the standardized molecular orientation of from 100 to 700.

*Temperature dependence of crystalline transition of highly-oriented poly(L-lactide)/poly(D-lactide) blend: In-situ synchrotron X-ray scattering study*, Polymer 54 (2013) 964-971 discloses an investigation into the dynamic formation and transition of sc-crystals in PLLA/PDLA drawn film. It was found that at room temperature the original PLLA/PDLA drawn film consisted of only α crystals, however, with temperature increasing, two populations of sc-crystals were formed at different temperatures from the oriented amorphous region and the molten α crystals in the highly-oriented sample.

Other prior art documents concerned with the manufacture of oriented PLA films include US2003038405, U.S. Pat. No. 7,670,545, EP1735373, U.S. Pat. No. 7,615,183, U.S. Pat. No. 8,263,197, EP2025703, JP157408, JP8073628, JP2003-103628 and WO9204413.

BRIEF DESCRIPTION OF THE DRAWINGS

The invention will now be more particularly described with reference to the following Figures.

DETAILED DESCRIPTION

Figure 1:
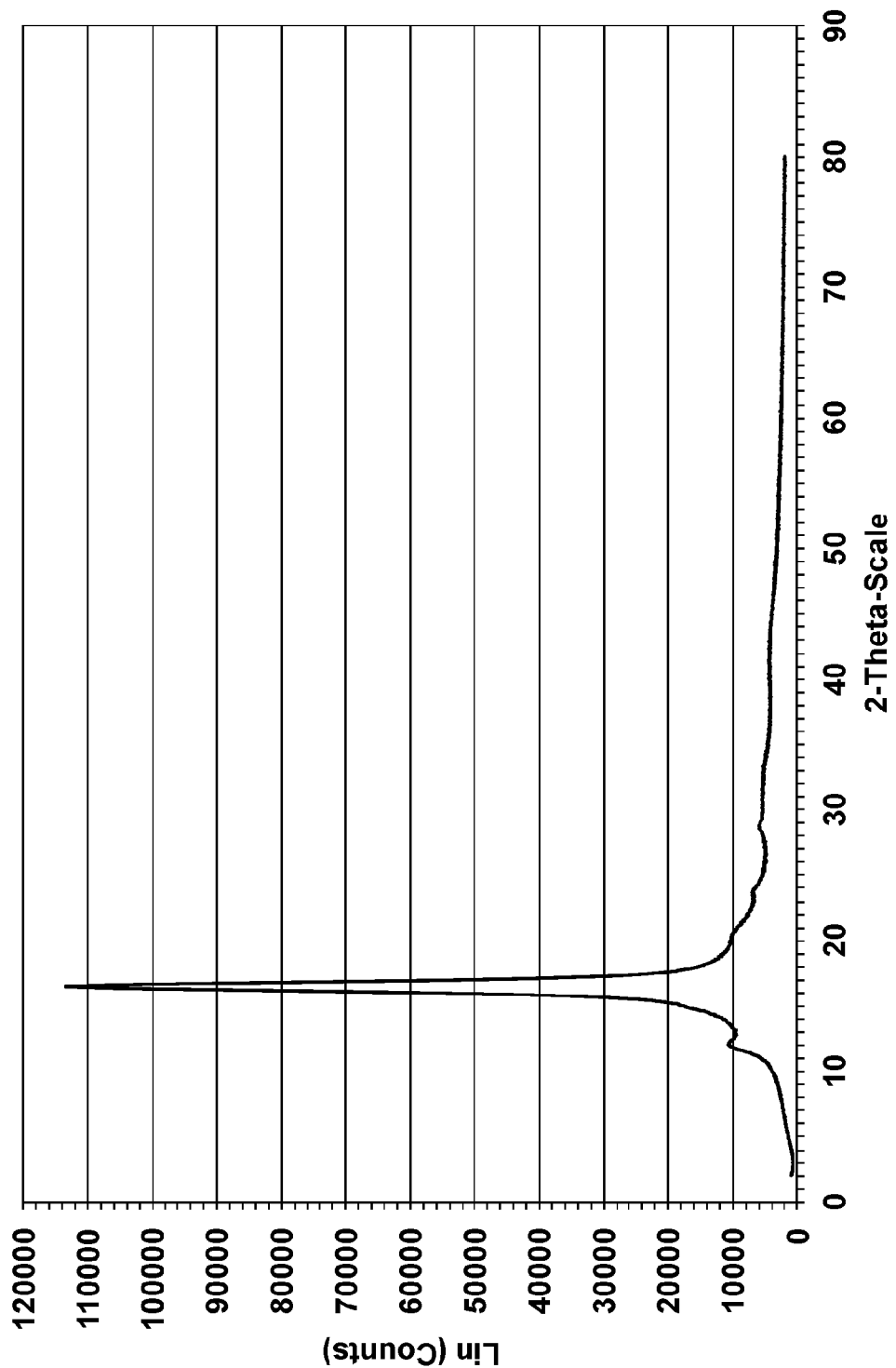
FIG. 1: a graphical representation of x-ray data for Sample 10.

It is an object of the present invention to provide improved forms of BOPLA films which exhibit enhanced levels of thermal stability in comparison to current commercially available films, and yet which maintain satisfactory optical and mechanical properties in particular with regard to transparency and flexibility. It is a particular object of the invention to provide such films incorporating a stereo-complex of PLLA and PDLA.

According to the present invention there is provided a transparent, dimensionally stable, oriented PLA film having a haze value of less than 3% and exhibiting strain induced crystallinity having been oriented from a substantially non-crystalline state by stretching the film by more than three times its original area.

By "substantially non-crystalline" is preferably meant that the film is at least 90% amorphous, preferably 95% amorphous, more preferably at least 98% amorphous and most preferably at least 99% amorphous. Films which are 100% amorphous prior to stretching are also contemplated within the scope of the invention.

We have found that the optical and/or mechanical properties of the oriented film are significantly and beneficially improved if at the point of orientation the film is substantially non-crystalline. In other words, it is desirable to hinder or prevent the formation of crystals in the unstretched (i.e. unoriented) film. One way of achieving this when the film is made by extrusion followed by stretching (as it is in a preferred process according to this invention, as explained below) is to quench the extrudate. Preferably the quench is effected immediately after extrusion—e.g. not more than 10 mins, not more than 5 mins, not more than 1 min, not more than 30 secs or not more than 10 secs after extrusion. Preferably the extrudate is quenched by a medium having a higher heat capacity than air and made to contact the extrudate immediately (as defined in preferably terms above) after extrusion. Water is one such suitable medium; many others will be apparent to the skilled addressee. Preferably the temperature of the quench medium is maintained at least about 50° C., more preferably at least about 100° C., still more preferably at least about 125° C. and most preferably at least about 150° C. below the temperature of the extrudate in the melt.

Other ways of ensuring substantial non-crystallinity in the film prior to drawing (i.e. stretching) may be apparent to the skilled addressee.

In one embodiment of the invention the film is oriented by simultaneous stretching in each of the transverse and longitudinal directions. However, sequentially stretched films are also within the scope of the invention—i.e. films which are stretched first in one or other of the transverse or longitudinal directions and then, subsequently, in the other direction. Monoaxially oriented films are also contemplated within the scope of this invention.

We have found that the combined features of stretching the film from a substantially non-crystalline state and ensuring that the area draw ratio is more than 3, reliably and consistently provides films with desirable optical and mechanical properties as more particularly specified below. Preferably when the film is biaxially stretched, the film is stretched by at least 2, more preferably at least 2.5 and most preferably at least 3, times its original dimensions in both the machine and transverse directions. Preferably when the film is monoaxially stretched the film is stretched by at least 10, more preferably at least 11, most preferably at least 12 times its original dimension in the stretched direction.

As a consequence of the draw ratio and/or draw speed, uniaxially oriented films in accordance with this invention exhibit birefringence, for example birefringence of at least about 200 nm, at least about 500 nm, at least about 1000 nm, at least about 1500 nm or at least about 2000 nm.

Without wishing to be bound by any such theory, we postulate that that draw speed as well as draw ratio is importance in producing films with good optics and mechanical properties. Facilitating the formation of stereocomplex in the film allows the film to survive a relatively high annealing temperature and subsequent strain relaxation of the film, leading to low shrinkage properties. A sufficient draw ratio and draw speed orients the polymer molecules and facilitates stereocomplex formation, either strain induced or by formation at the annealing stage. The draw speed in at least one of the machine or transverse directions of orientation should preferably be above about 150 μm/s, more preferably above about 500 μm/s, even more preferably above about 1000 μm/s, still more preferably above about 5000 μm/s, and most preferably above about 10,000 μm/s in order to form films with both good optical and mechanical properties.

The haze value (i.e. the wide angle haze) of the film measured according to ASTM D1003 using a BYK Gardner Haze Gard Plus device is optionally or preferably less than 2.9%, optionally or more preferably less than 2.8%, optionally or more preferably less than 2.5%; optionally or more preferably less than 2.0%; optionally or still more preferably less that 1.5%; optionally or most preferably less that 1.0%.

The films of the invention optionally or preferably exhibit a clarity measured according to ASTM D1003 using a BYK Gardner Haze Gard Plus device of at least about 95%, optionally or preferably at least about 96%, optionally or more preferably at least about 97%.

Optionally or preferably the film is oriented by stretching the film by an area draw ratio of at least four; optionally or more preferably by at least five; optionally or still more preferably by at least six.

The film may be biaxially oriented by means of simultaneous stretching in each of the transverse and longitudinal directions. However, we have found that it is also possible to ensure that the film has suitable optical and mechanical properties by processes involving sequential stretching of the film. The film may be stretched by at least about 1.5 times; optionally or preferably at least about 2 times; optionally or preferably at least about 2.5 times; optionally or preferably at least about 3 times; optionally or preferably at least about 3.5 times; optionally or preferably at least about 4 times; optionally or preferably at least about 5 times; optionally or preferably at least about 6 times its original dimensions in one or both of the transverse and longitudinal directions. The film may be stretched by the same amounts or by different amounts in each of the transverse and longitudinal directions. Alternatively, the film may be monoaxially oriented.

By "dimensionally stable" is optionally or preferably meant that the film of the invention exhibits a longitudinal (machine direction) shrinkage of less than 2%; optionally or preferably less than 1.5%; optionally or more preferably less than 1.25%; and optionally or most preferably less than 1.0% at 80° C. Alternatively, or as well, the film of the invention exhibits a longitudinal (machine direction) shrinkage of less than 5%; optionally or preferably less than 4%; optionally or more preferably less than 3%; and optionally or most preferably less than 2.0% at 120° C. Alternatively, or as well, the film of the invention exhibits a longitudinal (machine direction) shrinkage of less than 10%; optionally or preferably less than 7%; optionally or more preferably less than 5%; and optionally or most preferably less than 3.0% at 150° C. Alternatively, or as well, the film of the invention exhibits a longitudinal (machine direction) shrinkage of less than 20%; optionally or preferably less than 15%; optionally or more preferably less than 10%; and optionally or most preferably less than 5.0% at 180° C.

Alternatively, or as well, by "dimensionally stable" is optionally or preferably meant that the film of the invention exhibits a transverse direction shrinkage of less than 2%; optionally or preferably less than 1.5%; optionally or more preferably less than 1.25%; and optionally or most preferably less than 1.0% at 80° C. Alternatively, or as well, the film of the invention exhibits a transverse direction shrinkage of less than 5%; optionally or preferably less than 4%; optionally or more preferably less than 3%; and optionally or most preferably less than 2.0% at 120° C. Alternatively, or as well, the film of the invention exhibits a transverse direction shrinkage of less than 10%; optionally or preferably less than 7%; optionally or more preferably less than 5%; and optionally or most preferably less than 3.0% at 150° C. Alternatively, or as well, the film of the invention exhibits a transverse direction shrinkage of less than 20%; optionally or preferably less than 15%; optionally or more preferably less than 10%; and optionally or most preferably less than 5.0% at 180° C.

The films of the invention optionally or preferably comprise crystallinity in the form of a stereocomplex of crystalline PLLA and crystalline PDLA. Optionally, α-form crystals of PLLA and/or PDLA may be present in the film. However it is preferred that any such α-form crystals be present in the film (if at all) in amounts of less than 30% (by weight) of the amount of stereocomplex present; optionally or preferably less than 20% (by weight); optionally or more preferably less than 10% (by weight); and optionally or most preferably less than 5% (by weight). The stereocomplex form has a melting point of approximately 220° C. whereas the α-forms have melting points approximately in the range of from 160° C. to 170° C.

a. Without wishing to be bound by any such theory, it is believed that a small amount of the stereocomplex crystallinity present in the film may be formed during drawing of the film i.e. the stereocomplex crystallinity is strain induced. extruding a blend of a first PLA rich in L-lactate repeat units (optionally PLLA itself) and a second PLA rich in D-lactate repeat units (optionally PDLA itself) at a temperature of at least about 220° C. to provide an extrudate;

b. quenching the extrude directly after extrusion to a temperature below about 65° C. to hinder or prevent crystal formation in the extrudate;

c. reheating the quenched extrudate to a temperature of at least about 65° C. and subsequently immediately stretching the film to increase its area by at least three times to introduce orientation and crystallinity into the film, crystallinity being in the α-crystalline form and/or in the form of form of a stereocomplex of PLLA and/or PDLA; and heat setting the stretched and oriented crystalline film at a temperature of at least about 170° C. to melt out at least a proportion of any α-crystallinity in the film and However, the majority of the stereocomplex crystallinity is likely to be formed during annealing of the film, post-draw.

According to the present invention there is also provided a process for the manufacture of the films identified hereinabove, the process comprising the steps of:

d. optionally introduce stereocomplex crystallinity or further stereocomplex crystallinity into the film.

The first PLA used in the blend may be pure PLLA. However, optionally or preferably it may comprise a PLA copolymer rich in L-lactate repeat units. Such a PLA copolymer may include at least a minor amount of a D-lactide component in its monomeric composition for example from about 0.1 mol % to about 10 mol % of D lactide or from about 0.5 mol % to about 5 mol % D-lactide.

The second PLA used in the blend may be pure PDLA. However, optionally or preferably it may comprise a PLA copolymer rich in D-lactate repeat units. Such a PLA copolymer may include at least a minor amount of an L-lactide component in its monomeric composition; for example from about 0.1 mol % to about 10 mol % of L lactide or from about 0.5 mol % to about 5 mol % of L-lactide.

The blend of the first PLA (optionally including minor amounts of D isomer) and the second PLA (optionally including minor amounts of of L isomer) may comprise up to about 90%® by weight L-lactate repeat units, for example up to about 80% by weight L-lactate repeat units, or up to about 70%, 60% or 50% by weight L-lactate repeat units.

The blend of the first PLA (optionally including minor amounts of D isomer) and the second PLA (optionally including minor amounts of L isomer) may comprise up to about 90% D-lactate repeat units, for example up to about 80% by weight D-lactate repeat units, or up to about 70%, 60% or 50% by weight D-lactate repeat units.

The first PLA (optionally including minor amounts of D isomer) and the second PLA (optionally including minor amounts of L isomer) may be present in the blend in a ratio (first PLA:second PLA) of from 99:1 to 1:99. Preferably the blend comprises a ratio (first PLA:second PLA) of from 90:10 to 90:10, from 80:20 to 20:80, from 70:30 to 30:70; or from 60:40 to 40:60. A preferred blend may comprise a ratio (first PLA:second PLA) of 50:50.

Alternatively or as well, the blend may comprise the first PLA (optionally including minor amounts of D isomer) in an amount of at least 50%, at least 60%, at least 70%, at least 75%, at least 80% or at least 85% by weight of the blend. The blend may comprise the second PLA (optionally including minor amounts of L isomer) in an amount of 50% or less, 40% or less, 30% or less, 25% or less, 20% or less, or 15% or less by weight of the blend.

The inventors of the present invention have surprisingly found that a PLA film with good optical and shrinkage properties can be formed from a blend of a first PLA (as outlined above) and a second PLA (as outlined above) wherein the second PLA is present in an amount of 50% or less by weight of the blend. Unexpectedly, it has been found that a film comprising as little as 12.5% of the second PLA by weight of a blend, maintains good optical and shrinkage properties. This may provide huge economical benefits.

The extrusion temperature is optionally or preferably at least about 230° C.; optionally or more preferably at least about 240° C.; optionally or most preferably at least about 250° C. A preferred range of extrusion temperature is from 240° C. to 260° C. Preferably the extrusion temperature does not substantially exceed 270° C. to avoid the risk of the polymer decomposing at the extrusion temperature.

The quenching temperature is optionally or preferably below about 55° C.; optionally or more preferably below about 45° C. and optionally or most preferably below about 40° C. 30° C. to 40° C. is a preferred quenching temperature range. Preferably the extrudate is quenched from the extrusion temperature to the quenching temperature in under 1 minute, preferably under 45 seconds, more preferably under 30 seconds, still more preferably under 15 seconds and most preferably under 10 seconds, or even under 5 seconds.

The reheat temperature to which the film is heated immediately prior to stretching is optionally or preferably at least about 70° C.; optionally or more preferably at least about 75° C. and is optionally or most preferably in the range of from about 75° C. to about 85° C.

Heat setting of the film is optionally or preferably conducted at a temperature of at least about 175° C.; optionally or more preferably at least about 180° C.; and optionally or most preferably at least about 185° C. A preferred range of temperatures for the heat setting stage is from 190° C. to 210° C.

The extrudate after quenching but before stretching is preferably substantially amorphous. We have found that the amorphous nature of the extrudate prior to stretching provides significant advantages in connection with the final optical and/or mechanical properties of the film. It is advantageous to orient (by stretching) the polymeric molecules in the film prior to substantial crystallisation occurring. Crystallisation occurs during and/or after the stretching and gives rise to films with excellent mechanical and optical properties. These properties are further enhanced by ensuring that stretching is conducted simultaneously in the longitudinal and transverse directions.

It is thought (although the following explanation is provided merely to assist in understanding the likely processes behind the invention and should not be construed as limiting the invention in any way) that on slow cooling from the melt, crystal spherulites will nucleate and grow into large light scattering centres resulting in a very hazy cast. On rapid cooling (or quenching) there is insufficient time for the PLA to start that process or for the spherulites to grow to a significant size before it drops below its Tg and the structure becomes frozen. Additionally the nature of the polymer has a large impact on the crystallisation rate with factors such as molecular weight, stereoregularity, the presence of nucleating centres due to contaminants such as catalyst residues, or the addition of nucleating agents.

Enantomerically pure PLA can crystallise rapidly particularly with the presence of its chiral opposite e.g. PDLA added to PLLA. This is generally thought to be a consequence of the ease by which the D and L molecules nest together forming a nucleation site for further crystallisation of the dominant component in the alpha from.

As the level of PDLA and PLLA nears 50:50 crystallisation is largely in the stereocomplex form and takes place at significantly higher temperatures and rates.

Further crystallisation takes place duration the re-heating process of the cast sheet prior to orientation (cold crystallisation); and the rate of cold crystallisation is influenced by the structure formed in the cast sheet due to the cooling conditions from the melt.

The presence of crystallinity in the cast prior to orientation is not desired as the constrained structure of a semi crystalline material inhibits the ability of the polymer chains in the amorphous regions to unravel and slip past each other resulting in the development of very high draw stress as well as high haze.

For the avoidance of doubt, all features relating to the film of the present invention may also relate to the process of the invention and vice versa.

The invention will now be more particularly described with reference to the following Examples and Figures.

FIG. 1: a graphical representation of x-ray data for Sample 10.

Figure 2:
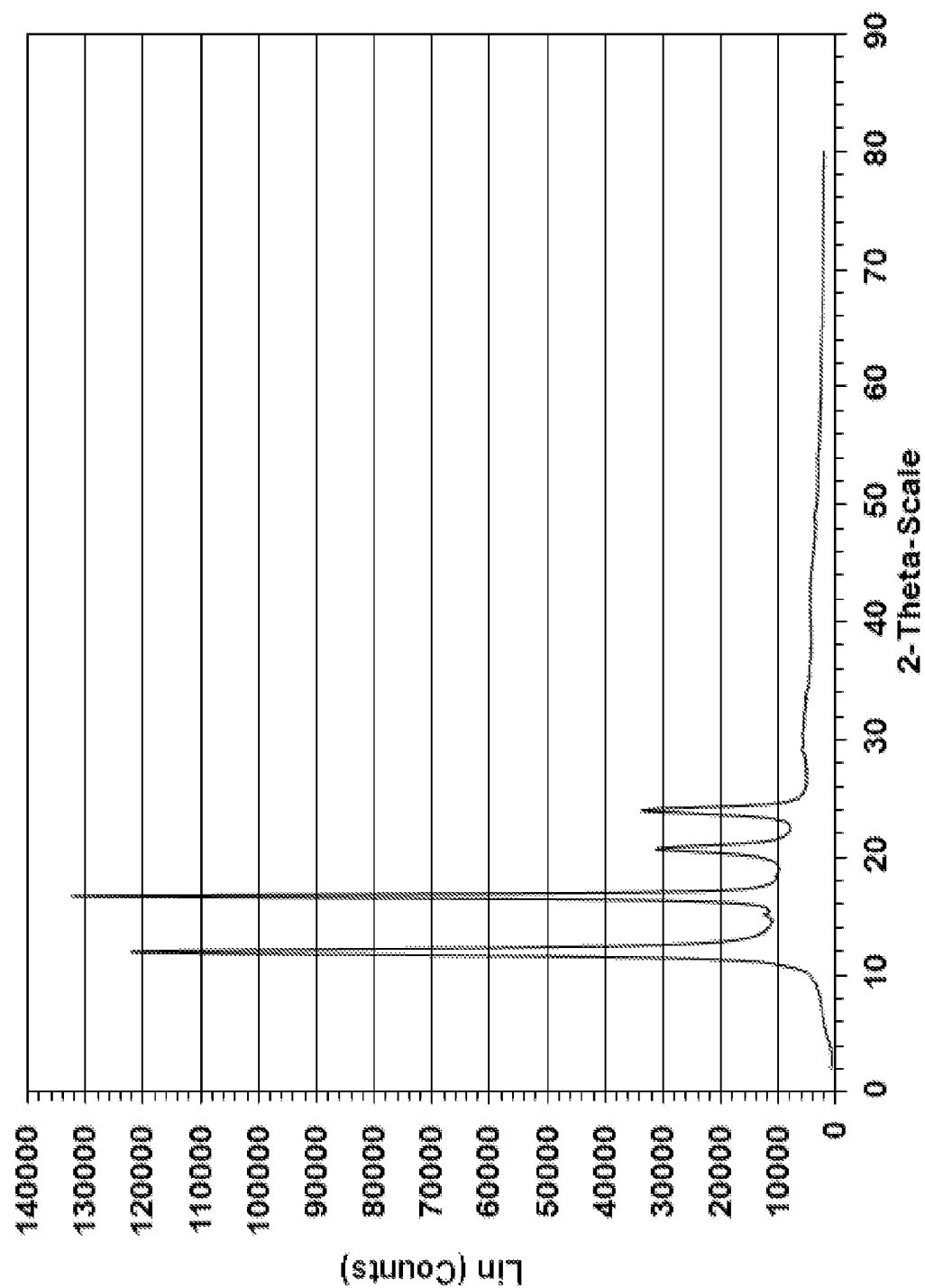
FIG. 2: a graphical representation of x-ray data for Sample 11.

FIG. 2: a graphical representation of x-ray data for Sample 11.

Figure 3:
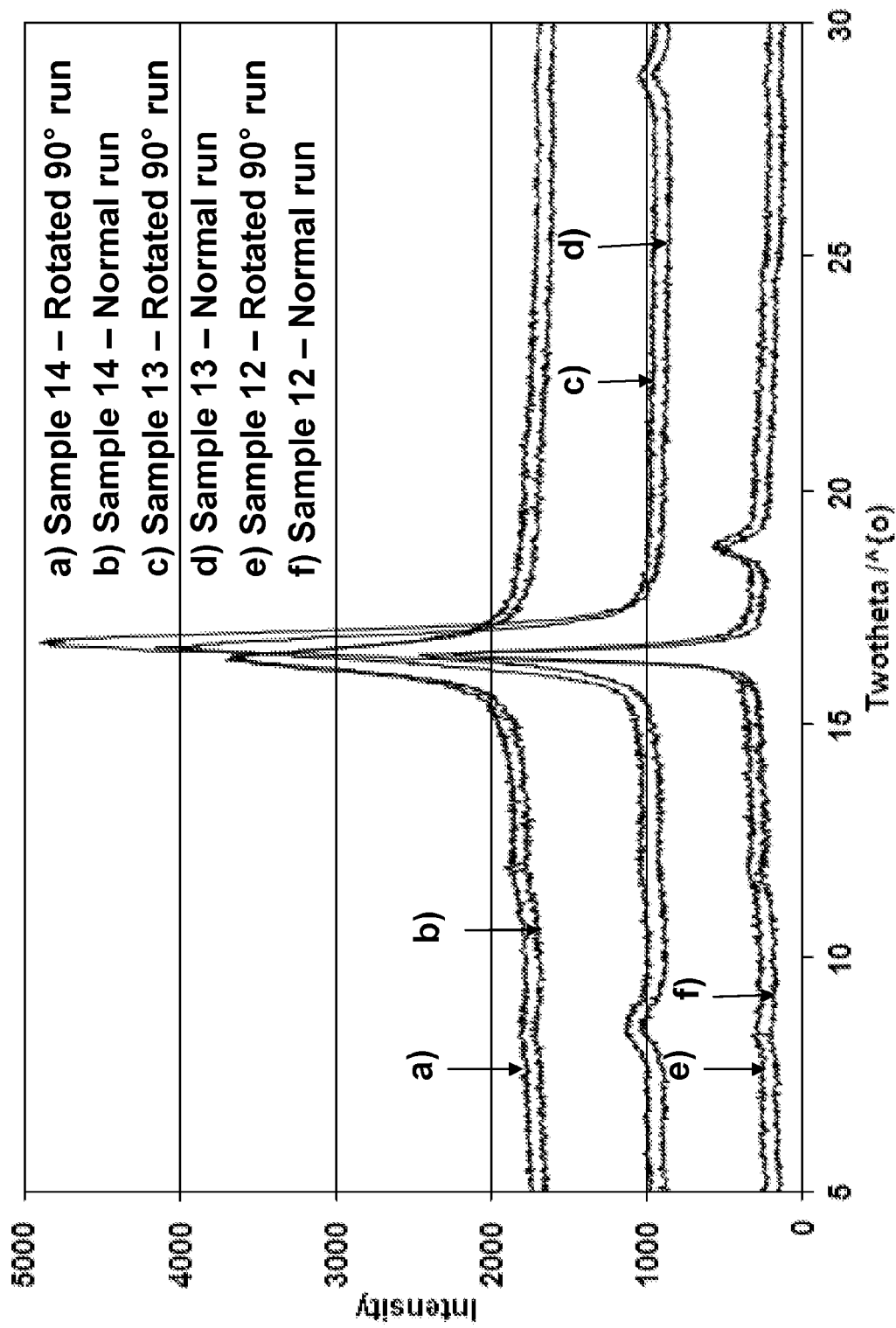
FIG. 3: a graphical representation of x-ray data for Samples 12, 13 and 14.

FIG. 3: a graphical representation of x-ray data for Samples 12, 13 and 14.

Figure 4:
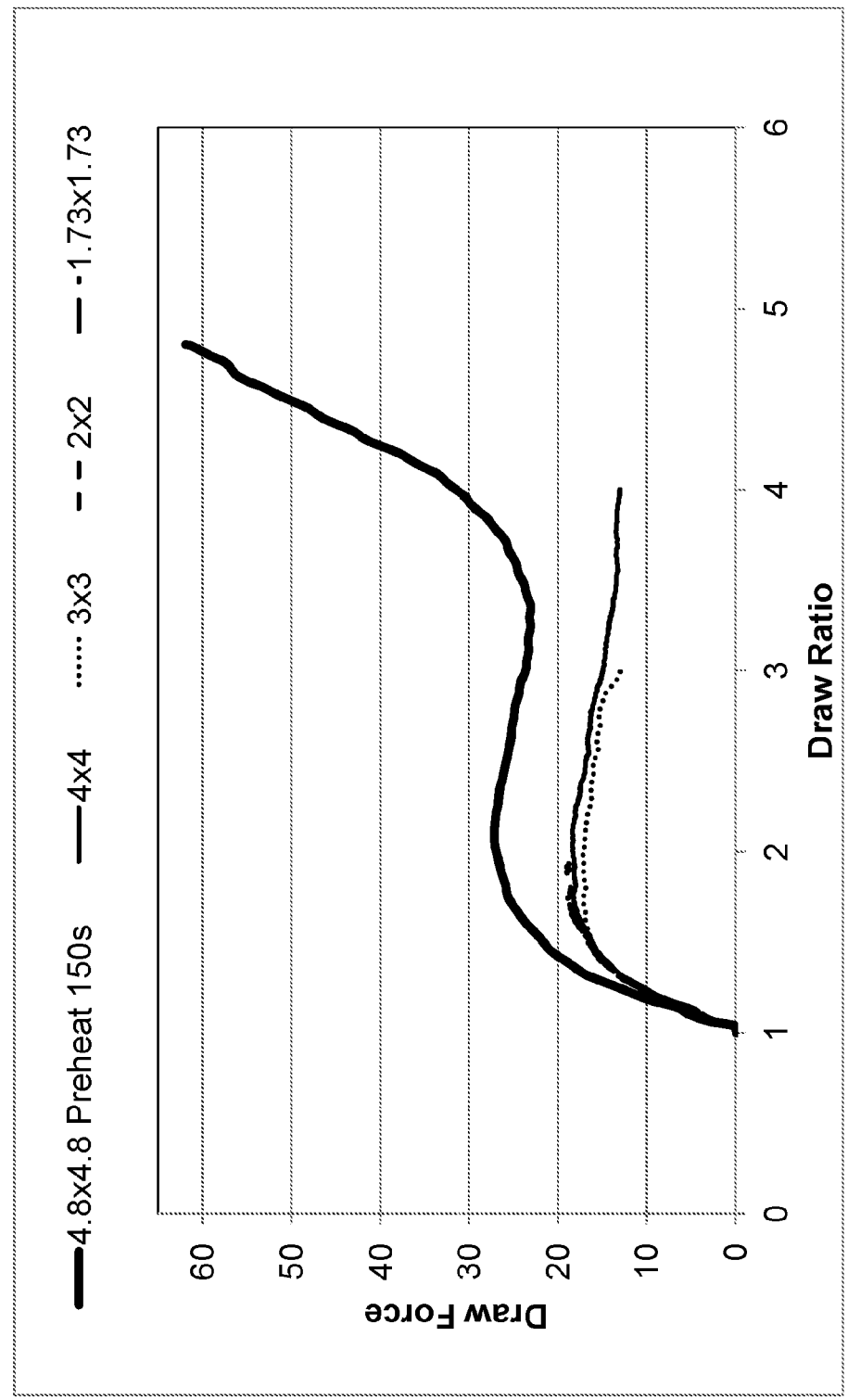
FIG. 4: a graphical representation of the draw forces associated with the samples drawn at 75° C. to a draw ratio of 4.8×4.8, 4×4, 3×3, 2×2 and 1.73×1.73.

FIG. 4: a graphical representation of the draw forces associated with the samples drawn at 75° C. to a draw ratio of 4.8×4.8, 4×4, 3×3, 2×2 and 1.73×1.73.

Figure 5:
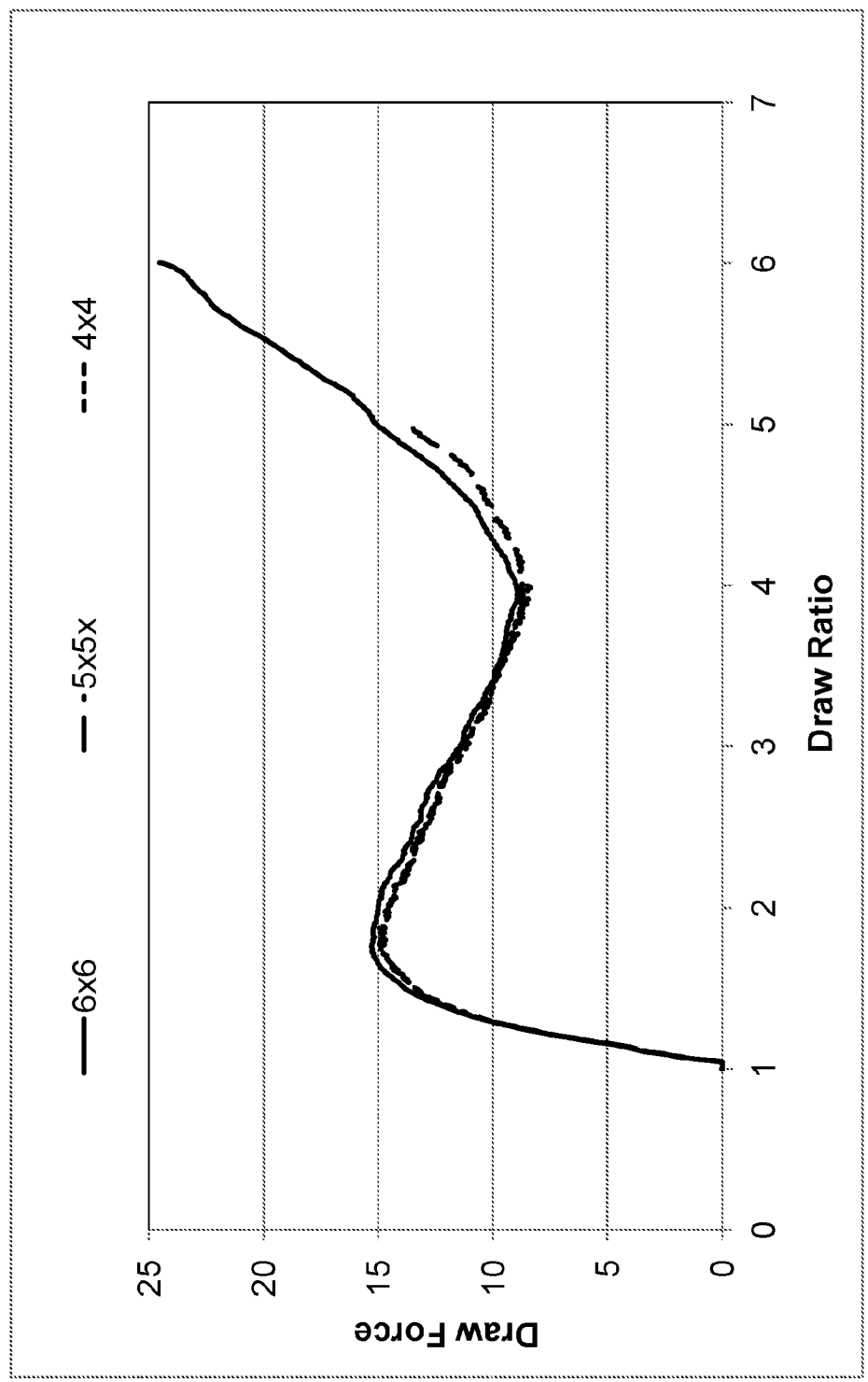
FIG. 5: a graphical representation of the draw forces associated with the samples drawn at 85° C. to a draw ratio of 6×6, 5×5 and 4×4.

FIG. 5: a graphical representation of the draw forces associated with the samples drawn at 85° C. to a draw ratio of 6×6, 5×5 and 4×4.

Figure 6:
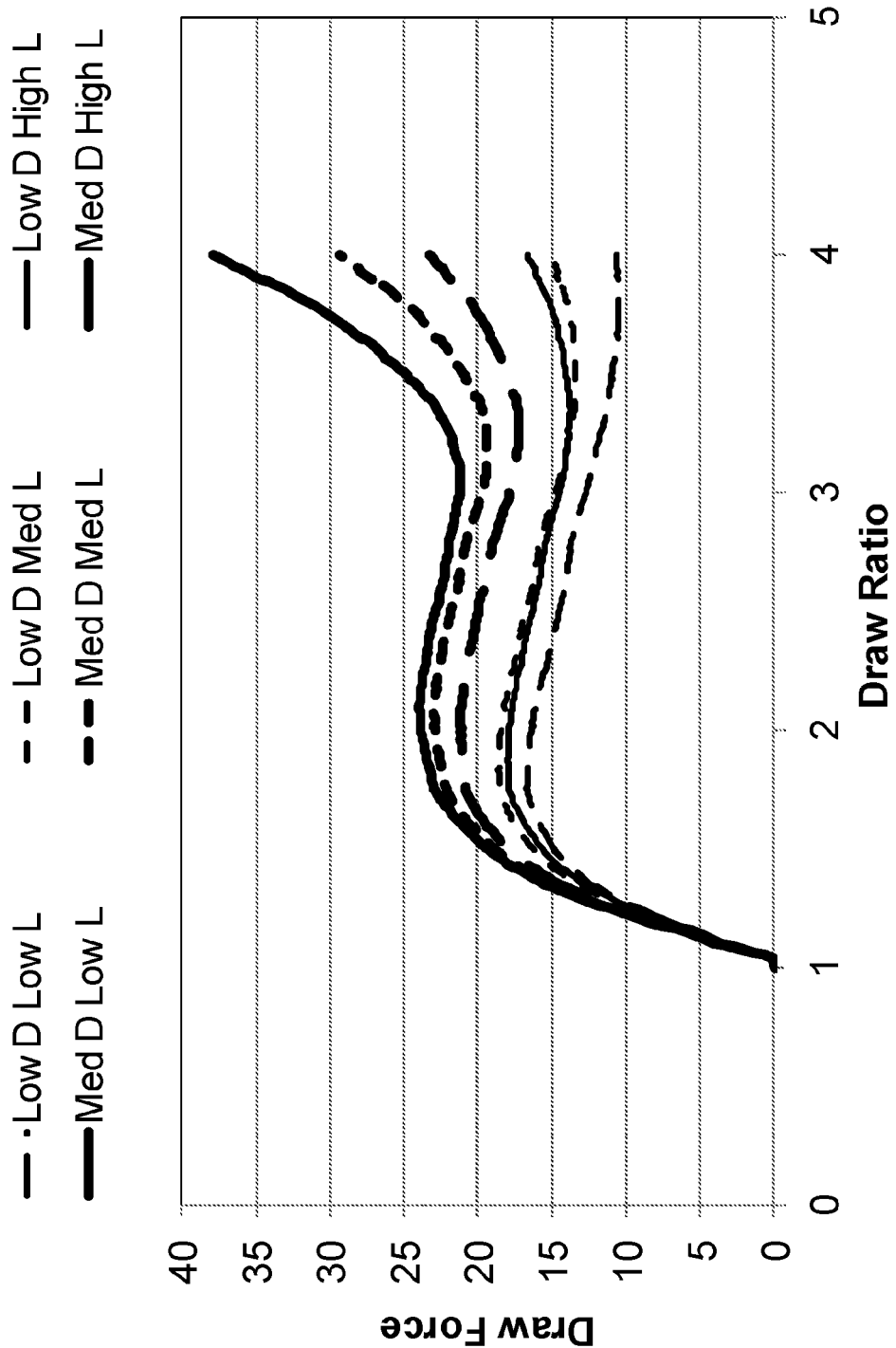
FIG. 6: a graphical representation of the draw forces associated with the samples drawn at 85° C. to a draw ratio of 4×4.

FIG. 6: a graphical representation of the draw forces associated with the samples drawn at 85° C. to a draw ratio of 4×4.

Figure 7:
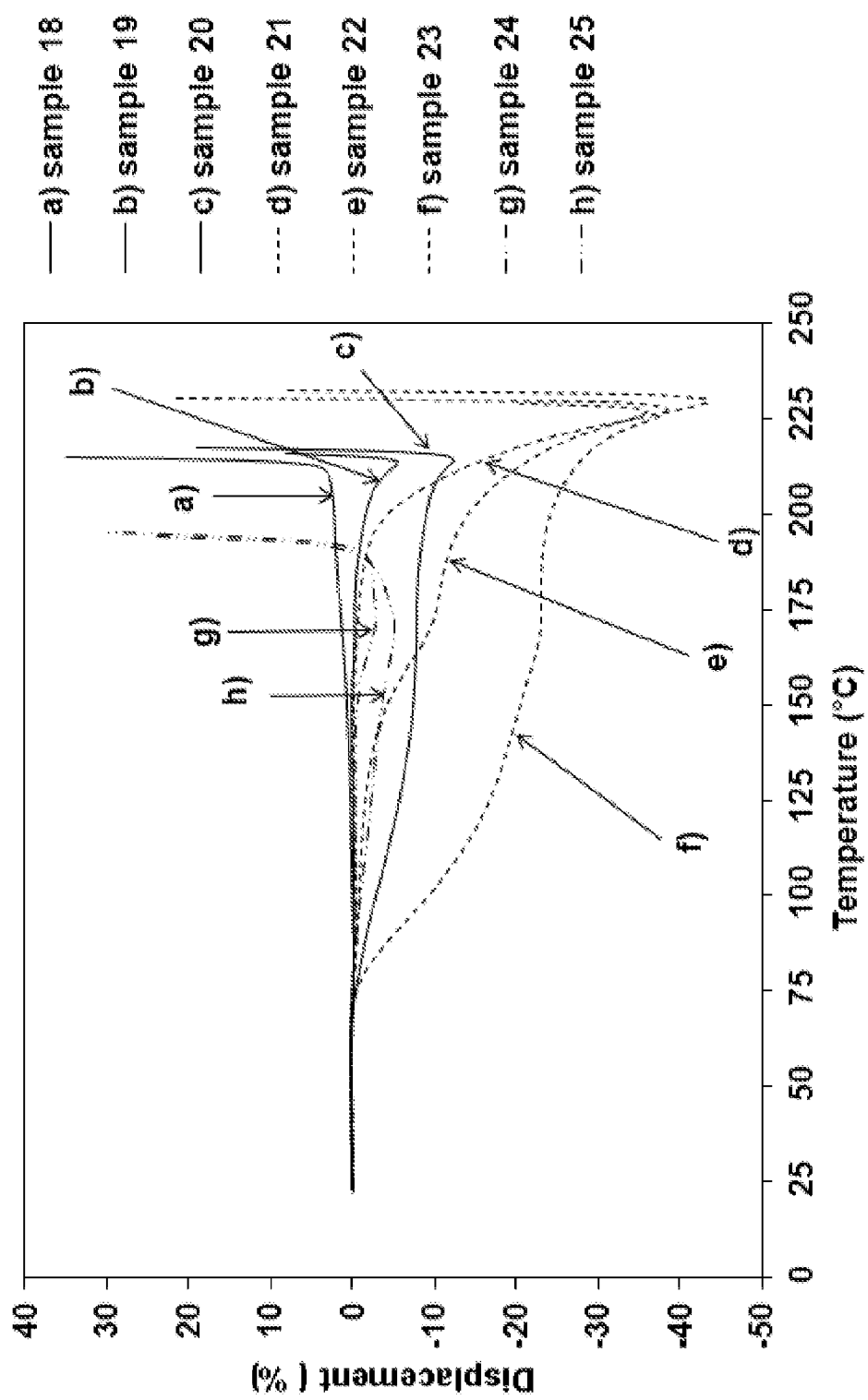
FIG. 7: a graphical representation of the shrinkage properties of samples 18 to 25 as determined by dynamic mechanical analysis.

FIG. 7: a graphical representation of the shrinkage properties of samples 18 to 25 as determined by dynamic mechanical analysis.

Figure 8:
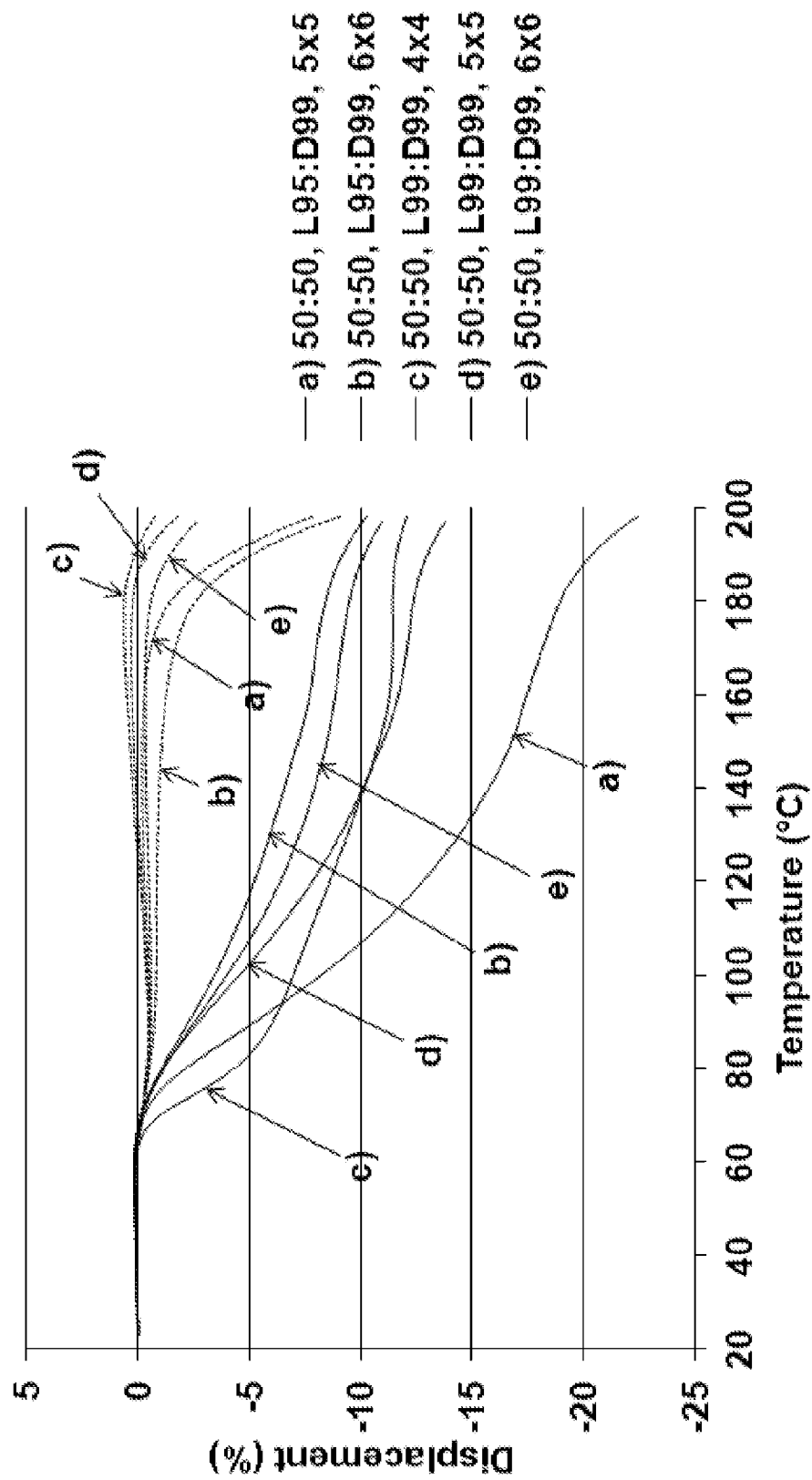
FIG. 8: a graphical representation of the shrinkage properties ten film samples as determined by dynamic mechanical analysis.

FIG. 8: a graphical representation of the shrinkage properties ten film samples as determined by dynamic mechanical analysis.

Figure 9:
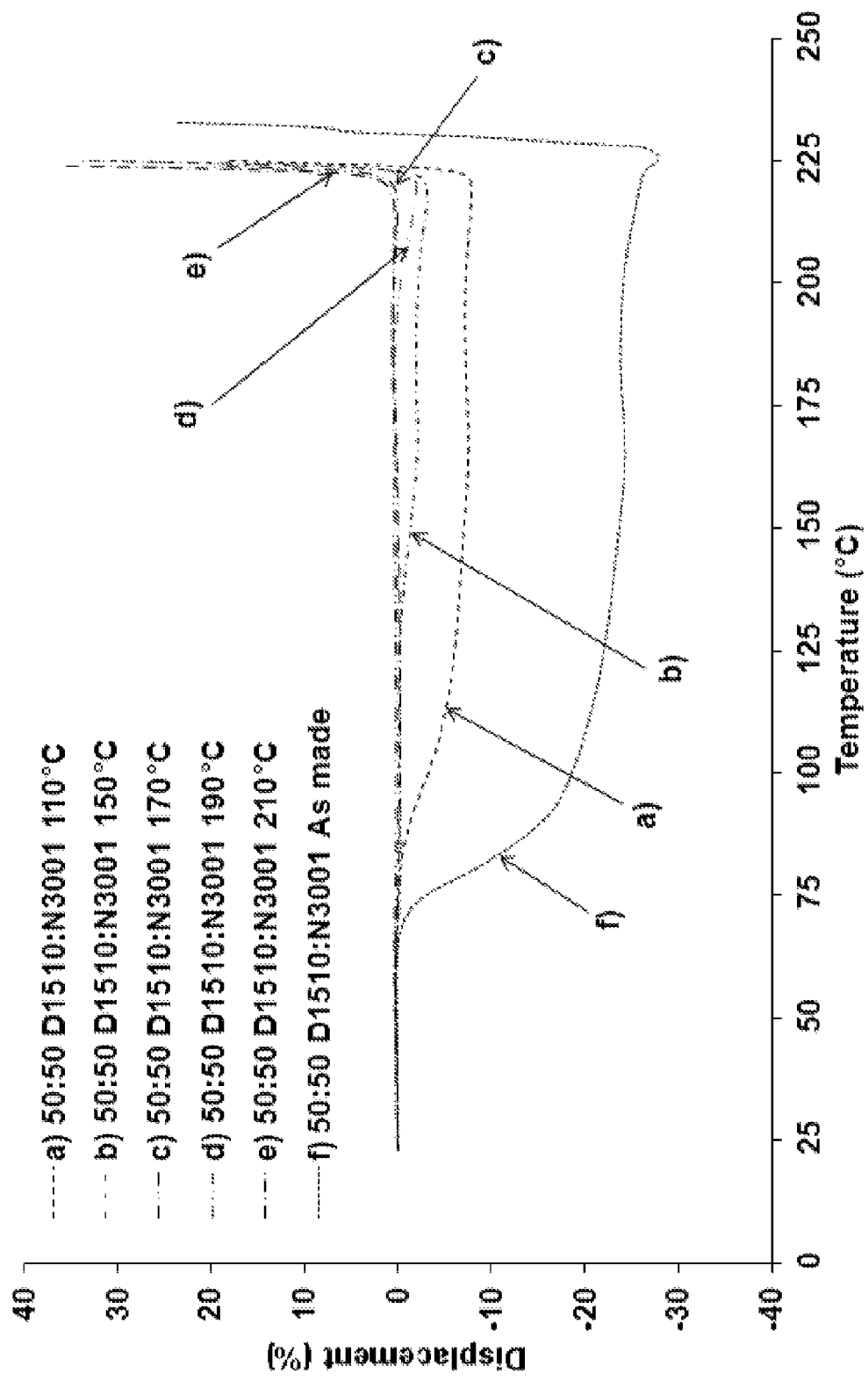
FIG. 9: a graphical representation of the shrinkage properties of samples 30 to 35 in the machine direction.

FIG. 9: a graphical representation of the shrinkage properties of samples 30 to 35 in the machine direction.

Figure 10:
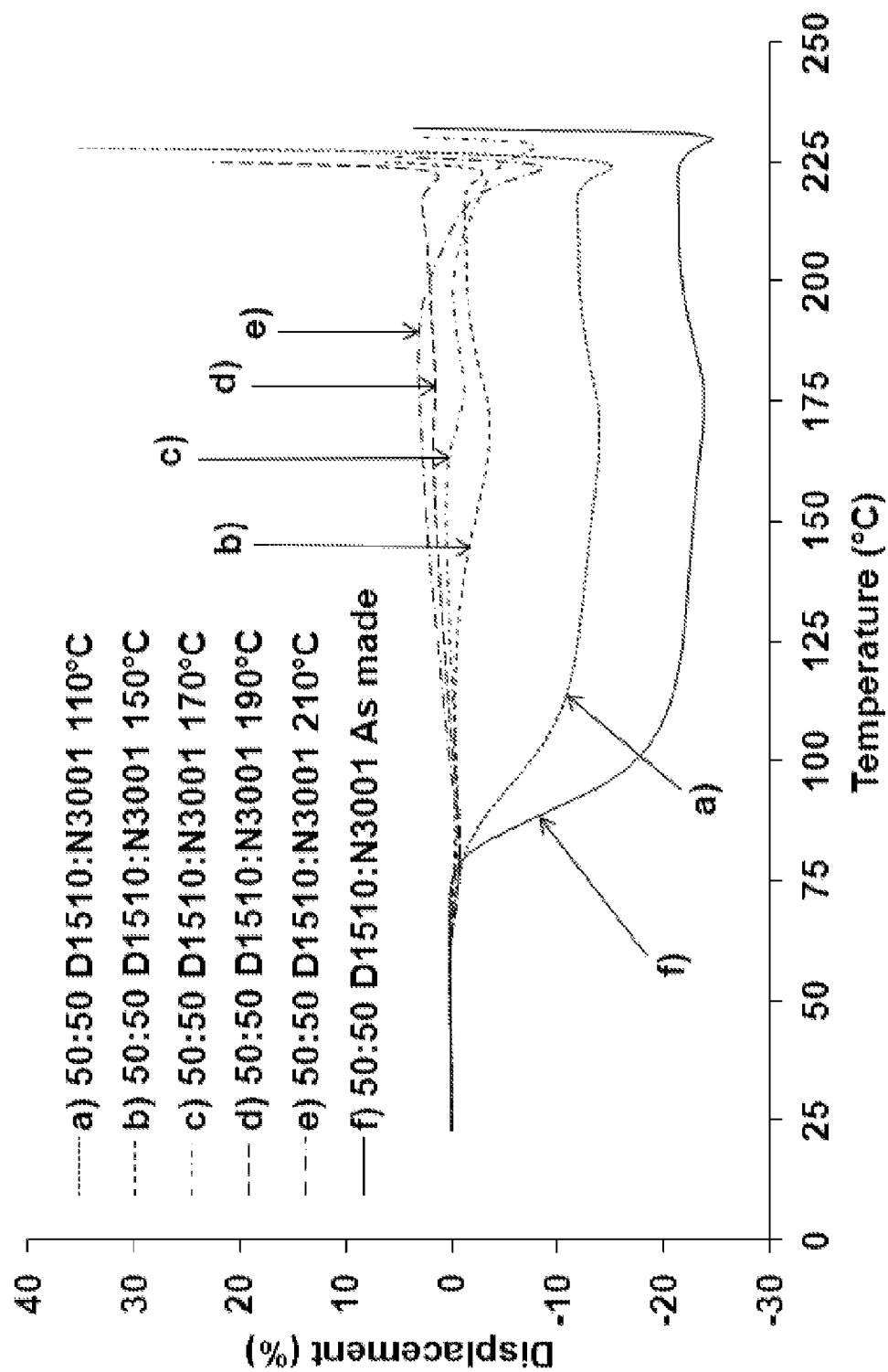
FIG. 10: a graphical representation of the shrinkage properties of samples 30 to 35 in the transverse direction.

FIG. 10: a graphical representation of the shrinkage properties of samples 30 to 35 in the transverse direction.

Figure 11:
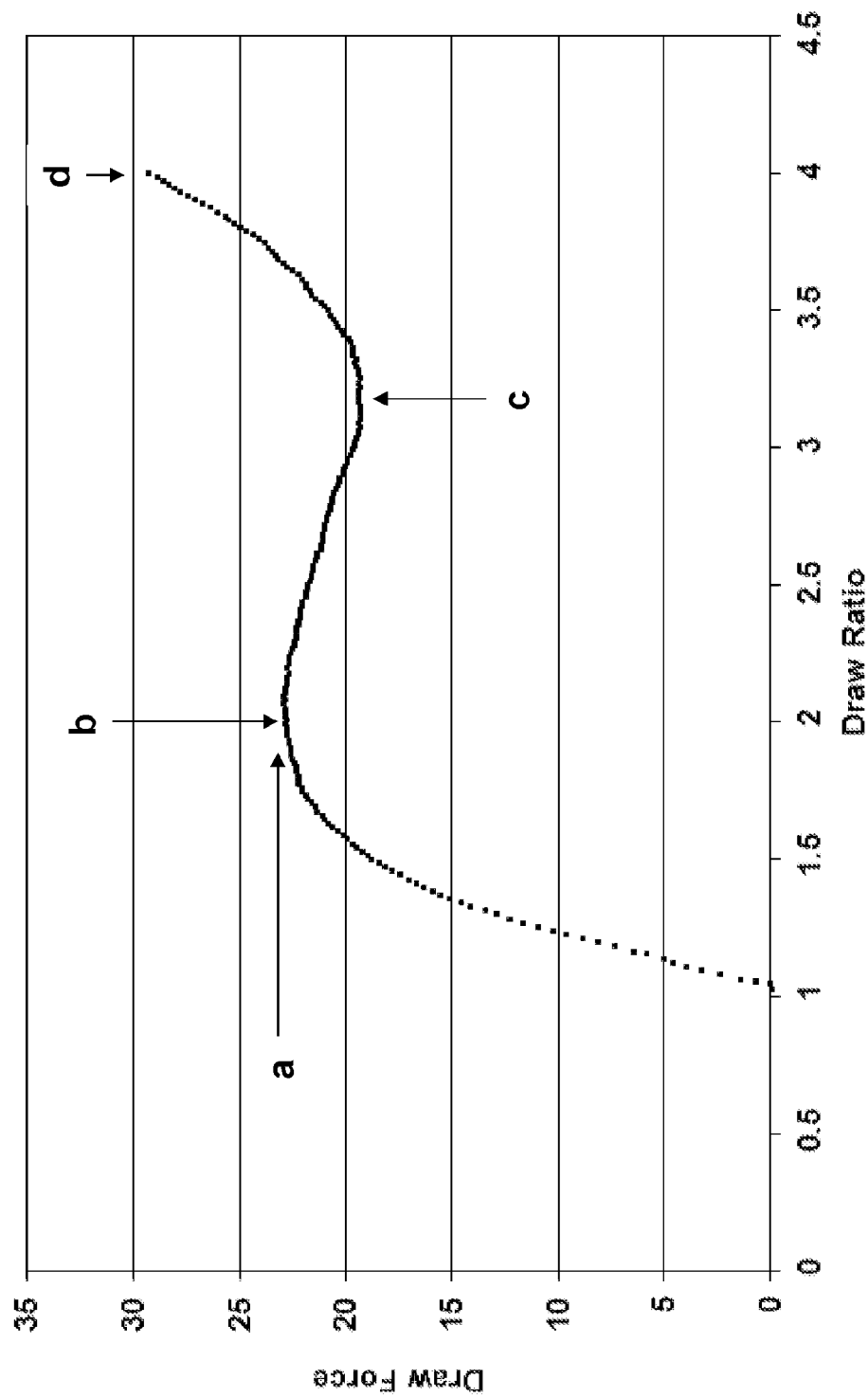
FIG. 11: A graphical representation of the data points plotted onto a graph by a computer in calculating the draw force (strain) for a given strain ratio, corrected for the thickness of the sample.

FIG. 11: A graphical representation of the data points plotted onto a graph by a computer in calculating the draw force (strain) for a given strain ratio, corrected for the thickness of the sample.

Example 1

Starting materials designated L99 (a low molecular weight PLA copolymer containing approximately 99% L-lactide and 1% D-lactide by weight) and D1010 (a low molecular weight PLA copolymer containing approximately 99.5% D-lactide and 0.5% L-lactide by weight), both provided by Purac, were pre-blended using a twin screw extruder at 240° C. in a ratio of 1:1. The resultant blend was quenched and lace cut, dried at 85° C. for 2 hours and then recrystallized at 115° C. for 10 minutes.

A sample of the above blend was taken and hot pressed by melting at 250° C. under a pressure of 5 tonnes for 4 minutes followed by an increase in pressure to 20 tonnes for a further 3.5 minutes, within a 0.6 mm frame.

Subsequently, the sample was removed from the hot press and left to cool on the laboratory bench at room temperature for 20 minutes, before being removed from the frame.

Visual inspection revealed that the sample was opaque and could not be stretch oriented. In fact, the sample shattered when an attempt was made to stretch it at 75° C. to a 4×4 draw ratio.

Table 1 shows the optical properties of the sample after cooling.

Table 2 shows the optical properties of the samples after stretching.

The results demonstrate the ineffectiveness of slow cooling of the sample. The sample shows poor optical properties after slow cooling and its mechanical properties prevent it from being stretched.

TABLE 1

| Sample | Draw Ratio | 45° Gloss | WAH | NAH Low | NAH High | Colour (D65 Lamp) | | | | | |
|---|---|---|---|---|---|---|---|---|---|---|---|
| | | | | | | Reflectance | | | Transmission | | |
| | | | | | | L | a | b | L | a | b |
| 1 | None | 42.7 | 85+ | Sample Too Thick | | 45.54 | −0.66 | −3.39 | 94.09 | 0.18 | −0.47 |

TABLE 2

| Sample | Draw Ratio | 45° Gloss | WAH | NAH Low | NAH High | Colour (D65 Lamp) Reflectance L | a | b | Transmission L | a | b |
|---|---|---|---|---|---|---|---|---|---|---|---|
| 1 | —* | — | — | — | — | — | — | — | — | — | — |

*Sample shattered into small pieces when attempting to draw

Differential scanning calorimetry (DSC) was performed on the sample after cooling (but prior to drawing). The sample was heated at a rate of 20° C. per minute from 0° C. to 250° C., under an atmosphere of dry nitrogen. The results are shown in Table 3.

By allowing the sample to slowly cool in air, the level of crystallinity in the material, particularly cold crystallinity, is increased. This is shown by a reduction in the change in heat capacity ($\Delta C_p$) through the glass transition ($T_g$). In addition, very little cold crystallisation was observed prior to the melt associated with the alpha peak. This suggests that slow cooling allows sufficient time for the sample to crystallise and is further supported by the larger enthalpy of melting of α-crystallinity.

In contrast, it is believed that cooling the sample quickly, for example by quenching with water, does not allow sufficient time for the sample to crystallise. This may significantly improve the optical properties of a film.

TABLE 3

| Sample No. | $T_g$ (° C.) | $\Delta C_p$ (Jg$^{-1}$) | $T_m^1$ (° C.) | $T_m^2$ (° C.) | $\Delta H_f^{cc}$ (Jg$^{-1}$) | $\Delta H_f^{\alpha}$ (Jg$^{-1}$) | $\Delta H_f^{cc}$ (Jg$^{-1}$) | $T_m^{sc}$ (° C.) | $\Delta H_f^{sc}$ (Jg$^{-1}$) |
|---|---|---|---|---|---|---|---|---|---|
| 1 | 54.6 | 0.3 | 162.9 | 169.7 | 0.5 | 34.3 | 12.6 | 220.6 | 43.4 |

$\Delta H_f^{cc}$—enthalpy of cold crystallisation
$\Delta H_f^{\alpha}$—enthalpy of melting of α-crystallinity
$\Delta H_f^{sc}$—enthalpy of melting of stereocomplex crystallinity

| Sample No. | Casting Temperature | Thickness (mm) | Draw Ratio |
|---|---|---|---|
| 2 | 30° C. | 0.32 | 4 × 4 |
| 3 | 40° C. | 0.32 | 4 × 4 |
| 4 | 50° C. | 0.38 | 4 × 4 |
| 5 | 55° C. | 0.31 | 4 × 4 |

The resulting film samples were then stretch oriented to a 4×4 draw ratio using a Bruckner Karo IV Stretcher under standard conditions (7.6 m/min draw speed, 85° C. pre-heating for 15 seconds for thin samples of roughly 0.3 mm and up to 40 seconds for samples of 1.4 mm thickness, followed by annealing at 110° C. for 10 seconds where applicable). The drawn samples were analysed and then further annealed at a temperature of 180° C. for 60 seconds in a laboratory Tenter Frame.

The optical and mechanical properties of the film samples prior to the annealing step at 180° C. are shown in Table 4 and those after the annealing step at 180° C. are shown in Table 5. In all of the following tables 'Haze' refers to wide angle haze which is measured according to ASTM D1003.

TABLE 4

| Sample No. | Transmission | Haze | Clarity | Av. Gloss (45°) | Shrinkage (%) at 80° C. |
|---|---|---|---|---|---|
| 2 | 95.4 | 0.85 | 98.2 | 78.6 | 0.6 |
| 3 | 95.3 | 0.72 | 98.3 | 80.9 | 0.5 |
| 4 | 95.4 | 0.71 | 97.4 | 79.5 | 0.6 |
| 5 | 95.4 | 0.65 | 98.3 | 75.5 | 0.7 |

TABLE 5

| Sample No. | Transmission | Haze | Clarity | Av. Gloss (45°) | Shrinkage (%) 80° C. | 120° C. | 150° C. | 180° C. |
|---|---|---|---|---|---|---|---|---|
| 2 | 95.1 | 1.59 | 98.9 | 68.3 | 0.4 | — | 1.4 | 1.3 |
| 3 | 95.1 | 1.37 | 98.5 | 71.0 | 0.2 | — | 1.1 | 1.3 |
| 4 | 95 | 2.41 | 87 | 66.4 | 0.6 | — | 1.0 | 1.4 |
| 5 | 95.1 | 2.88 | 96.4 | 74.8 | 0.6 | 0.5 | 0.5 | 0.8 |

Example 2

Starting materials designated L99 and D99 (a low molecular weight PLA copolymer containing approximately 99.5% D-lactide and 0.5% L-lactide by weight) were blended using a twin screw extruder at 240° C. in a ratio of 1:1.

Polylactic acid film samples were produced by casting the molten extrudate from the twin screw extruder onto a heated roller which was maintained at a temperature below the cold crystallisation temperature. For each of the film samples, the heated roller was maintained at a different temperature, namely 30° C., 40° C., 50° C. and 55° C.

From the results in Table 5 it can be seen that the polylactic acid films have improved optical properties, particularly haze and clarity, when they are quench cooled to a lower temperature following extrusion.

Example 3

Polylactic acid film samples were formed from a 1:1 blend of L99 and D99 or from a 1:1 blend of L95 (a low molecular weight PLA copolymer containing approximately 95% L-lactide and 5% D-lactide by weight) and D99, by injection moulding the blend at 240° C. into a mould maintained at a temperature of either 30° C. (Samples 6 and 8) or 90° C. (Comparative Samples 7 and 9), for a residence time of between 1.5 and 3 minutes. The samples were then stretched on a Bruckner Karo IV Stretcher under standard conditions (as previously outlined) to a draw ratio of 4.5×4.5.

The samples produced using the mould at 30° C. were pre-heated for an additional 60 seconds before being drawn. Samples produced using the mould at 90° C. were stretched under standard conditions. The results from this experiment are shown in Table 6.

The results show that it is necessary to quench cool the polylactic acid blend to a temperature below the cold crystallisation temperature of the blend (in this case using a low mould temperature of 30° C.) and to rapidly heat the material prior to orienting the film in order to obtain a film with high heat stability and good optical properties.

TABLE 6

| Sample No. | Components | Injection Mould Temp. (° C.) | Gloss (45°) | WAH | NAH High | NAH Low | % Shrinkage 80° C. | % Shrinkage 120° C. | Thickness (μm) |
|---|---|---|---|---|---|---|---|---|---|
| 6 | L99, D99 | 30 | 88.2 | 1.0 | 11.4 | 2.9 | 2.2 | 12.9 | 77 |
| 7 (Comp) | L99, D99 | 90 | 54.6 | 17.2 | 40.1 | 17.9 | 1.3 | 7.7 | 65.3 |
| 8 | L95, D99 | 30 | 93.6 | 0.8 | 2.9 | 0.5 | 9 | 14.1 | 82.1 |
| 9 (Comp) | L95, D99 | 90 | 74.8 | 5.4 | 31.0 | 9.3 | 1.9 | 11 | 69.5 |

Example 4

Samples of medium molecular weight PDLA and medium molecular weight PLLA (containing approximately 99% L-lactide and 1% D-lactide by weight) were blended in a 1:1 ratio and injection moulded to give plaque samples with a thickness of approximately 1.4 mm.

The plaque samples were then stretched using a Karo IV Stretcher under standard stretching conditions at 85° C. to give a draw ratio of 4×4. One of the stretched samples was annealed at 110° C. for 10 seconds (Sample 10) whilst the other was first annealed at 110° C. for 10 seconds and then further annealed at 180° C. for 60 seconds (Sample 11).

The two samples were submitted for x-ray analysis and the results obtained are shown in Table 7. Graphical representation of x-ray data for Sample 10 is shown in FIG. 1 and foFrom Table 7 and FIGS. 1 and 2, it can be seen that both samples show the presence of stereocomplex crystallinity, although the stereocomplex crystallinity is more prevalent in Sample 11 which was annealed to a higher temperature. Without wishing to be bound by any such theory, it is believed that the stereocomplex crystallinity may be present immediately after drawing the sample, after annealing the sample at 110° C. or a combination of both. It is also believed that the generation of further stereocomplex crystallinity may be a consequence of annealing at a higher temperature.

TABLE 7

| | X-Ray Scattering Data | | | | | | | |
|---|---|---|---|---|---|---|---|---|
| Sample | Peak 1 | | Peak 2 | | Peak 3 | | Peak 4 | |
| No. | Position | Size | Position | Size | Position | Size | Position | Size |
| 10 | 12.026 | 1116.1 | 16.482 | 3788.4 | | | | |
| 11 | 11.945 | 2964 | 16.691 | 1892.2 | 20.691 | 615.5 | 23.96 | 671.5 |
| X-Ray Reference Data Peaks | | | | | | | | |
| α-Crystalline PLA | | | 16.5 | | 19 | | | |
| Stereo-complex Crystalline PLA | 12 | | | | 20.5 | | 24 | |

Example 5

Three samples of a blend of L99 and D99 in a ratio of 1:1 were drawn at different rates and/or draw ratios as follows:

| Sample No. | Stretch Type | Draw Ratio | Draw Speed (m/min) |
|---|---|---|---|
| 12 | Uniaxially | 1 × 8.7 | 0.02375 |
| 13 | Uniaxially | 1 × 8.7 | 7.6 |

-continued

| Sample No. | Stretch Type | Draw Ratio | Draw Speed (m/min) |
|---|---|---|---|
| 14 | Simultaneous biaxially | 3 × 3 | 7.6 |

None of the samples were annealed, although Sample 12 was in the oven at the draw temperature for a significantly longer period of time than Sample 13 and Sample 14. The increase in residence time caused the film of Sample 12 to be opaque which may suggest that the material underwent cold crystallisation during stretching.

The birefringence properties of the three samples are shown in Table 8.

TABLE 8

| Sample | Birefringence (nm) | |
|---|---|---|
| No. | Min | Max |
| 12 | 100 | 200 |
| 13 | 2800 | 3200 |
| 14 | 200 | 275 |

The low birefringence values for Sample 12 are indicative of low orientation in the sample. Thus, any crystallinity in the sample is likely to be as a result of cold crystallinity. The high birefringence values for Sample 13 are indicative of high orientation in the sample. This infers that α-crystallinity is formed during the draw.

The three samples were analysed using x-ray diffraction, the results of which are shown in FIG. 3.

There is some suggestion in the XRD graph in FIG. 3 that stereocomplex crystallinity is present in the samples. This supports the theory that stereocomplex crystallinity may be formed during drawing of the film.

Example 6

Samples formed of a 1:1 mixture of L99 and D99 were injection moulded to give plaque samples with approximate thicknesses of 0.7 mm, 1.0 mm or 1.4 mm. The samples were then stretched using a Karo IV Stretcher under standard stretching conditions at either 75° C. for 100 seconds or at 85° C. for 40 seconds. A 1.73×1.73 draw ratio was tested as a comparative example along with draw ratios ranging from 2×2 to 6×6. The samples were then annealed at 110° C. for 10 seconds and subsequently annealed at 180° C. for 60 seconds.

The optical and shrinkage properties of the stretched films after annealing at 110° C. and after annealing at 180° C. were tested, and the results shown in Table 9.

both the machine direction and the transverse direction. Thus, the area of the sample is the square of the draw ratio shown on the graph.

FIG. 5 shows the draw forces associated with the samples drawn at 85° C. to a draw ratio of 6×6, 5×5 and 4×4 and annealed at 110° C. for 10 seconds. Note that the draw ratio shown on the x-axis in the graph is only in one direction. In reality, the films are simultaneously drawn in both the machine direction and the transverse direction. Thus, the area of the sample is the square of the draw ratio shown on the graph.

Example 7

Three samples formed from a 1:1 mixture of L99 and D99 were injection moulded to give plaque samples with an approximate thickness of 0.6 mm. Each sample was then stretched using a Karo IV Stretcher under standard stretching conditions at 75° C. and a draw speed of 7.6 m/min. Sample 15 was simultaneously stretched to a draw ratio of 3×3. Sample 16 was stretched sequentially to a draw ratio of 3×3, first in the machine direction and then in the transverse direction. Sample 17 was stretched sequentially to a draw ratio of 3×3, first in the transverse direction and then in the machine direction. The optical properties of each of the samples were taken and the results are recorded in Table 10.

TABLE 9

| Draw Ratio | Prior to Annealing at 180° C. | | | | | | After Annealing at 180° C. | | | | | | | |
|---|---|---|---|---|---|---|---|---|---|---|---|---|---|---|
| | | | | | Shrinkage % | | | | | | Shrinkage % | | | |
| | T | H | C | G | 80° C. | 120° C. | T | H | C | G | 80° C. | 120° C. | 150° C. | 180° C. |
| Stretch at 75° C. | | | | | | | | | | | | | | |
| 1.73 × 1.73 | 94.9 | 6.6 | 67.6 | 65.2 | — | — | 94.3 | 4.2 | 68.4 | 54.4 | — | — | — | — |
| 2 × 2 | 95.0 | 2.8 | 66.9 | 73.2 | — | — | 94.5 | 2.8 | 65.5 | 55.1 | — | — | — | — |
| 3 × 3 | 95.3 | 1.9 | 81.2 | 82.9 | 0.3 | 0.4 | 94.6 | 2.3 | 80.5 | 49.9 | — | — | — | — |
| 4 × 4 | 95.3 | 1.4 | 98.9 | 87.3 | 0.6 | 10.8 | 95.1 | 0.7 | 99.2 | 79.6 | 0.3 | 0.5 | 0.4 | 0.8 |
| 4.8 × 4.8 | 95.4 | 0.3 | 99.7 | 90.7 | 1.1 | 16.0 | 95.0 | 0.6 | 99.5 | 89.6 | 0.0 | — | 0.8 | 3.0 |
| Stretch at 85° C. | | | | | | | | | | | | | | |
| 4 × 4 | 95.2 | 1.4 | 99.2 | 80.4 | 0.3 | 1.2 | 95.1 | 1.3 | 99.2 | 82.7 | 0.5 | 1.0 | 0.6 | 0.6 |
| 5 × 5 | 95.4 | 0.9 | 99.4 | 83.7 | 0.2 | 1.5 | 95.1 | 0.7 | 99.2 | 79.7 | 0.3 | 0.7 | 1.3 | 1.1 |
| 6 × 6 | 95.3 | 0.1 | 99.6 | 79.3 | 0.3 | 3.4 | 95.1 | 0.5 | 99.6 | 85.3 | 0.6 | 1.0 | 1.1 | — |
| Stretch at 85° C. Alternate Low Viscosity PLLA | | | | | | | | | | | | | | |
| 6 × 6 | 95.4 | 0.7 | 99.3 | 88.2 | 0.5 | 4.9 | 95.1 | 0.7 | 99.2 | 83.2 | 0.2 | 0.6 | 1.1 | 1.2 |

T—Transmission
H—Haze
C—Clarity
G—45° Gloss

Note—shrinkages could not be determined for samples drawn to a ratio of less than 3×3 as the samples were too thick to cut accurately using standard methods.

From the table it can be seen that the film sample drawn to 1.73×1.73 (a comparative example, being stretched by only three times its original areal dimensions) has a high level of haze whereas all the remaining film samples have good optical properties. Further to this, the samples drawn by a ratio of 3×3 or more all show good shrinkage properties.

FIG. 4 shows the draw forces associated with the samples drawn at 75° C. to a draw ratio of 4.8×4.8, 4×4, 3×3, 2×2 and 1.73×1.73 and annealed at 110° C. for 10 seconds. Note that the draw ratio shown on the x-axis in the graph is only in one direction. In reality, the films are simultaneously drawn in

TABLE 10

| Sample No. | Trans | Haze | Clarity | 45° Gloss |
|---|---|---|---|---|
| 15 | 95.3 | 1.9 | 81.2 | 82.9 |
| 16 | 95.2 | 1.7 | 85.1 | 79.3 |
| 17 | 95.4 | 1.1 | 88.4 | 86.2 |

All the film samples show good optical properties which suggests that the sequence of drawing may not affect the optical properties of the film.

Example 8

Samples of low and medium molecular weight PDLA were blended with a range of PLLA samples which have a low D-lactide content of approximately 1%, to produce a 1:1 blend. These blends were injection moulded to give plaque samples of approximately 1.4 mm thickness. Each of the plaque samples was then stretched using a Karo IV Stretcher under standard stretching conditions at 85° C., to a draw ratio of 4×4. The stretched samples were subsequently annealed at 110° C. for 10 seconds and then at 180° C. for 60 seconds.

The optical and shrinkage properties of each of the sample films were recorded after annealing at 110° C. and then again after annealing at 180° C. The results are shown in Tables 11 and 12.

TABLE 11

| Sample | | After Annealing at 110° C. | | | | | |
|---|---|---|---|---|---|---|---|
| Type | Type | | | | | Shrinkage % | |
| PDLA | PLLA | T | H | C | G | 80° C. | 120° C. |
| LMW | LMW | 95.3 | 1.4 | 98.7 | 88.2 | 0.6 | 2.0 |
| LMW | LMW | 95.2 | 0.8 | 99.2 | 88.6 | 0.6 | 3.3 |
| LMW | MMW | 95.2 | 1.3 | 98.9 | 88.2 | 1.1 | 3.3 |
| LMW | HMW | 94.8 | 2.7 | 87.6 | 84.7 | 0.3 | 1.6 |
| MMW | LMW | 95.2 | 1.1 | 98.0 | 87.3 | 0.9 | 6.7 |
| MMW | MMW | 95.2 | 0.8 | 99.5 | 88.8 | 0.4 | 10.1 |
| MMW | HMW | 95.1 | 0.7 | 97.7 | 84.4 | 1.8 | 12.1 |

LMW—low molecular weight
MMW—medium molecular weight
HMW—high molecular weight
T—Transmission
H—Haze
C—Clarity
G—45° Gloss

TABLE 12

| Sample | | After Annealing at 180° C. | | | | | | | |
|---|---|---|---|---|---|---|---|---|---|
| Type | Type | | | | | Shrinkage % | | | |
| PDLA | PLLA | T | H | C | G | 80° C. | 120° C. | 150° C. | 180° C. |
| LMW | LMW | 95.2 | 0.9 | 99.0 | 89.7 | 0.7 | 1.0 | 0.9 | 1.5 |
| LMW | LMW | 95.0 | 1.1 | 98.8 | 88.3 | 0.5 | 0.6 | 0.3 | 1.6 |
| LMW | MMW | 95.1 | 2.2 | 98.3 | 89.7 | 0.4 | 0.9 | 1.1 | 2.3 |
| LMW | HMW | 94.9 | 2.1 | 92.3 | 87.3 | 0.4 | 0.8 | 1.1 | 1.4 |
| MMW | LMW | 95.0 | 1.3 | 98.1 | 89.8 | 0.3 | 1.2 | 0.9 | 1.4 |
| MMW | MMW | 94.9 | 0.6 | 99.3 | 92.1 | 0.3 | 0.9 | 1.1 | 2.0 |
| MMW | HMW | 94.9 | 1.5 | 97.7 | 88.9 | 0.4 | 1.2 | 1.4 | 7.8 |

LMW—low molecular weight
MMW—medium molecular weight
HMW—high molecular weight
T—Transmission
H—Haze
C—Clarity
G—45° Gloss The samples formed from the various combinations of low, medium and high molecular weight PDLA and PLLA all showed good optical and shrinkage properties. It may be that the low shrinkage is due to the presence of stereocomplex crystallinity in the samples, since the presence of stereocomplex crystallinity allows the film to survive high temperature annealing and permit strain relaxation.

FIG. 6 shows the draw forces associated with the samples drawn at 85° C. to a draw ratio of 4×4. Note that the draw ratio shown on the x-axis in the graph is only in one direction. In reality, the films are simultaneously drawn in both the machine direction and the transverse direction. Thus, the area of the sample is the square of the draw ratio shown on the graph.

Example 9

Samples of low and medium molecular weight PDLA were blended with various low, medium and high molecular weight PLLA samples with a D-lactide content of from 0% to 12%, to produce a 1:1 blend. These blends were injection moulded to give plaque samples of approximately 1.4 mm thickness. Each of the plaque samples was then stretched using a Karo IV Stretcher under standard stretching conditions at 75° C., 85° C. and/or 100° C., to a draw ratio of 4×4. The stretched samples were subsequently annealed at 110° C. for 10 seconds and then at 180° C. for 60 seconds.

The results in Table 13 show the optical and shrinkage properties for samples made with PDLA and PLLA with a D-lactide content of approximately 5%, after annealing at 110° C.

TABLE 13

| | Material | | After Annealing at 110° C. | | | | | |
|---|---|---|---|---|---|---|---|---|
| | PLLA (D-lactide | | | | | Gloss | Shrinkage % | |
| PDLA | content ~5%) | | Trans | Haze | Clarity | 45° | 80° C. | 120° C. |
| | | | Stretched at 75° C. | | | | | |
| LMW | LMW | | 95.2 | 0.4 | 99.1 | 89.4 | 0.5 | 2.2 |
| MMW | MMW | | 95.1 | 1.0 | 99.4 | 88.9 | 1.0 | 10.2 |
| | | | Stretched at 85° C. | | | | | |
| LMW | LMW | | 95.2 | 1.2 | 97.6 | 86.4 | 0.7 | 1.9 |
| MMW | MMW | | 95.1 | 0.4 | 99.4 | 88.6 | 0.6 | 7.5 |
| LMW | HMW | | 94.9 | 1.6 | 99.1 | 86.8 | 0.6 | 5.8 |

LMW—low molecular weight
MMW—medium molecular weight
HMW—high molecular weight

The results in Tables 14 show the optical and shrinkage properties for samples made with PDLA and PLLA with a D-lactide content of approximately 5%, after annealing at 180° C.

TABLE 14

| | Material | | After Annealing at 180° C. | | | | | | | |
|---|---|---|---|---|---|---|---|---|---|---|
| | PLLA (D-lactide | | | | | Gloss | Shrinkage % | | | |
| PDLA | content ~5%) | | Trans | Haze | Clarity | 45° | 80° C. | 120° C. | 150° C. | 180° C. |
| | | | Stretched at 75° C. | | | | | | | |
| LMW | LMW | | 94.8 | 0.7 | 99.0 | 89.9 | 0.3 | 0.3 | 0.3 | 1.1 |
| MMW | MMW | | 95.0 | 1.7 | 99.1 | 88.8 | 0.1 | 1.1 | 0.9 | 1.6 |
| | | | Stretched at 85° C. | | | | | | | |
| LMW | LMW | | 95.0 | 1.4 | 97.6 | 74.1 | — | — | — | — |
| MMW | MMW | | 94.8 | 1.0 | 99.2 | 90.3 | 0.4 | 0.6 | 1.0 | 1.1 |
| LMW | HMW | | 94.8 | 1.4 | 98.0 | 90.7 | 0.0 | 0.8 | 0.8 | 1.0 |

LMW—low molecular weight
MMW—medium molecular weight
HMW—high molecular weight

From the results in Tables 13 and 14 it can be seen that all the samples containing PLLA with a D-lactide content of approximately 5% are able to form stable films which can be annealed at elevated temperatures. This may be due to the formation of stereocomplex crystallinity.

The results in Table 15 show the optical and shrinkage properties for various samples made with low or medium molecular weight PDLA and low, medium or high molecular weight PLLA having various D-lactide contents (0%, approximately 5% or approximately 10%). The results were taken after annealing at both 110° C. for 10 seconds and at 180° C. for 60 seconds.

TABLE 15

| Sample | | | | NAH | | Thickness | Shrinkage | | Colour (transmission) | | |
|---|---|---|---|---|---|---|---|---|---|---|---|
| PDLA | PLLA | 45° Gloss | WAH | min | max | μm | 80° C. | 120° C. | L | a | b |
| | | | | Stretched at 75° C. | | | | | | | |
| LMW | ~1% LMW | 92.2 | 1.2 | 0.8 | 2.3 | 120.9 | 1.9 | 14.3 | 97.147 | 0.001 | 0.132 |
| LMW | 60% 0% D LMW + 40% ~5% D LMW | 90.7 | 0.7 | 0.4 | 1.1 | 78.3 | 2.0 | 14.3 | 97.144 | 0.001 | 0.117 |
| LMW | ~5% D LMW | 89.3 | 0.6 | 2.5 | 7.6 | 44.2 | 1.0 | 5.0 | 97.403 | 0.004 | 0.119 |
| LMW | 60% 0% D LMW + 40% ~5% D LMW | 88.2 | 0.6 | 0.7 | 4.7 | 49.8 | 1.8 | 11.8 | 97.373 | 0.004 | 0.118 |
| MMW | ~1% MMW | 88.3 | 0.6 | 0.7 | 9.1 | 66.7 | 1.8 | 11.6 | 97.060 | −0.026 | 0.275 |
| | | | | Stretched at 85° C. | | | | | | | |
| LMW | 60% 0% D LMW + 40% ~5% D LMW | 86.3 | 2.0 | 3.4 | 11.0 | 63.0 | 1.2 | 1.8 | 97.565 | −0.003 | 0.230 |

TABLE 15-continued

| Sample | | 45° Gloss | WAH | NAH | | Thickness | Shrinkage | | Colour (transmission) | | |
| --- | --- | --- | --- | --- | --- | --- | --- | --- | --- | --- | --- |
| PDLA | PLLA | | | min | max | μm | 80° C. | 120° C. | L | a | b |
| LMW | ~1% LMW | 86.7 | 0.3 | 2.4 | 19.1 | 45.2 | 0.7 | 1.0 | 97.344 | 0.005 | 0.145 |
| LMW | ~1% MMW | 89.7 | 1.1 | 0.1 | 1.4 | 107.4 | 1.8 | 11.6 | 97.201 | −0.027 | 0.245 |
| | | | | Stretched at 100° C. | | | | | | | |
| MMW | ~1% MMW | 90.6 | 0.8 | 0.7 | 3.8 | 53.5 | — | — | 97.100 | −0.028 | 0.217 |
| MMW | ~5% D MMW | 88.3 | 0.9 | 1.3 | 7.6 | 66.7 | — | — | 97.060 | −0.026 | 0.275 |
| MMW | 60% 0% D LMW + 40% ~5% D LMW | 90.3 | 0.6 | 0.7 | 9.2 | 74.6 | — | — | 97.136 | −0.024 | 0.262 |
| MMW | ~1% LMW | 89.8 | 0.7 | 1.4 | 9.4 | 78.9 | — | — | 97.081 | −0.024 | 0.251 |
| MMW | ~1% MMW | 89.7 | 0.8 | 0.7 | 2.0 | 51.1 | — | — | 98.846 | −0.042 | 0.328 |
| MMW | 60% 0% D LMW + 40% ~5% D LMW | 88.0 | 1.2 | 3.1 | 10.4 | 77.4 | — | — | 97.207 | −0.016 | 0.259 |
| MMW | ~1% LMW | 88.9 | 0.8 | 0.7 | 5.3 | 55.8 | — | — | 97.090 | −0.034 | 0.244 |
| MMW | ~0% HMW | 88.4 | 1.2 | 1.4 | 3.1 | 97.0 | — | — | 97.015 | −0.016 | 0.321 |

LMW—low molecular weight
MMW—medium molecular weight
HMW—high molecular weight

From the results in Table 15 it can be seen that all the samples produced films with good optical and shrinkage properties.

Example 10

Samples of low molecular weight PDLA were blended with various low, medium and high molecular weight PLLA samples with a D-lactide content of from 0% to 12%, to produce a 1:1 blend of PDLA:PLLA materials. These blends were injection moulded to give plaque samples of approximately 1.4 mm thickness. Each of the plaque samples was then stretched using a Karo IV Stretcher under standard stretching conditions at 75° C. and/or 85° C., to a draw ratio of 4×4. The stretched samples were subsequently annealed at 110° C. for 10 seconds and sometime later annealed at 110° C., 160° C. and/or 210° C. for 60 seconds. The samples had the following secondary annealing temperatures and polymer blends:

| Sample No. | Secondary Annealing Temperature (° C.) | Sample Blend |
| --- | --- | --- |
| 18 | 210 | 50% ~5% D PLLA LMW and 50% PDLA LMW |
| 19 | 160 | 50% ~5% D PLLA LMW and 50% PDLA LMW |
| 20 | 110 | 50% ~5% D PLLA LMW and 50% PDLA LMW |
| 21 | 210 | 50% ~1% D PLLA HMW and 50% PDLA LMW |
| 22 | 160 | 50% ~1% D PLLA HMW and 50% PDLA LMW |
| 23 | 110 | 50% ~1% D PLLA HMW and 50% PDLA LMW |
| 24 | 160 | 50% ~12% D PLLA MMW and 50% PDLA LMW |
| 25 | 110 | 50% ~12% D PLLA MMW and 50% PDLA LMW |

LMW—low molecular weight
MMW—medium molecular weight
HMW—high molecular weight

Each of the samples was tested for both levels of crystallinity (using differential scanning calorimetry) and shrink performance (using dynamic mechanical analysis).

The results in Table 16 show the melting profiles obtained using differential scanning calorimetry at a heating rate of 20° C. min$^{-1}$ under dry nitrogen. The results were taken after annealing at 110° C. for 10 seconds (but prior to reheating).

TABLE 16

| Sample No. | $T_g$ (° C.) | $\Delta C_p$ (Jg$^{-1}$) | $T_m^1$ (° C.) | $T_m^2$ (° C.) | $T_m^3$ (° C.) | $T_m^4$ (° C.) | $T_m^5$ (° C.) | $\Delta H_f^{cc}$ (Jg$^{-1}$) | $\Delta H_f^{\alpha}$ (Jg$^{-1}$) | $T_m^{sc}$ (° C.) | $\Delta H_f^{cc}$ (Jg$^{-1}$) | $\Delta H_f^{sc}$ (Jg$^{-1}$) |
| --- | --- | --- | --- | --- | --- | --- | --- | --- | --- | --- | --- | --- |
| 18 | 61.9 | 0.2 | — | — | 173.0 | — | — | 4.8 | — | 209.6 | 0.0 | 57.7 |
| 19 | 61.4 | 0.1 | 146.4 | — | 170.7 | — | — | 2.7 | 2.0 | 209.5 | 1.1 | 45.3 |
| 20 | 61.9 | 0.1 | 146.7 | — | 169.3 | — | — | 3.8 | 5.0 | 210.2 | 2.5 | 42.0 |
| 21 | 65.8 | 0.2 | — | — | 173.8 | — | 195.2 | 7.4 | — | 220.4 | 0.0 | 50.7 |
| 22 | 66.0 | 0.1 | — | — | 172.2 | — | — | 1.0 | 17.5 | 219.1 | 5.5 | 35.6 |
| 23 | 67.6 | 0.2 | — | 163.9 | 172.1 | — | — | 10.7 | 12.6 | 219.1 | 9.3 | 35.8 |
| 24 | 62.1 | 0.3 | — | — | 174.0 | 187.6 | — | 5.8 | 32.9 | — | — | — |
| 25 | 60.4 | 0.2 | — | — | 173.0 | 187.4 | — | 9.2 | 30.8 | — | — | — |

$\Delta H_f^{cc}$—enthalpy of cold crystallization
$T_g$—glass transition temperature
$\Delta H_f^{\alpha}$—enthalpy of melting of α-crystallinity
$T_m$—melt temperature
$\Delta H_f^{sc}$—enthalpy of melting of stereocomplex crystallinity The results in Table 17 show the melting profiles obtained using differential scanning calorimetry at a heating rate of 20° C. min$^{-1}$ under dry nitrogen. The results were taken after reheating the sample to the secondary annealing temperature (as outlined in the above table) for 60 seconds.

FIG. 7 is a graphical representation of the shrinkage properties of the film as determined using dynamic mechanical analysis. Each sample was heated at a rate of 2° C. min$^{-1}$ with a thickness dependant preload force applied. Negative displacement on the graph equates to shrinkage of the sample film.

quently annealed at 110° C. for 10 seconds and further annealed at 180° C. for 60 seconds.

Table 18 shows the optical and shrinkage properties of the film samples after annealing at 110° C. (but prior to annealing at 180° C.).

Table 19 shows the optical and shrinkage properties of the film samples after annealing at 180° C.

Additionally, the draw forces of the samples were analysed. Draw forces are determined by placing the sample in a stretching frame and drawing the material out. The draw force (strain) is measured for a given strain ratio correct for the thickness of the sample, and these data points are plotted onto a graph by a computer. FIG. 11 represents schematically a simple example of the type of results obtained from this technique, where a=initial yield force, b=initial yield draw ratio, c=minimum yield draw ratio and d=maximum draw force.

The draw force results for the samples are shown in Table 20.

TABLE 17

| Sample No. | $T_g$ (° C.) | $\Delta C_p$ (Jg$^{-1}$) | $T_m^1$ (° C.) | $T_m^2$ (° C.) | $T_m^3$ (° C.) | $T_m^4$ (° C.) | $T_m^5$ (° C.) | $\Delta H_f^{cc}$ (Jg$^{-1}$) | $\Delta H_f^\alpha$ (Jg$^{-1}$) | $T_m^{sc}$ (° C.) | $\Delta H_f^{cc}$ (Jg$^{-1}$) | $\Delta H_f^{sc}$ (Jg$^{-1}$) |
|---|---|---|---|---|---|---|---|---|---|---|---|---|
| 18 | 59.2 | 0.5 | 153.0 | 174.3 | — | — | — | 30.0 | 16.1 | 211.1 | 2.0 | 15.7 |
| 19 | 58.4 | 0.5 | 152.8 | 173.8 | — | — | — | 29.7 | 14.2 | 211.0 | 2.6 | 16.5 |
| 20 | 58.1 | 0.5 | 152.5 | 173.4 | — | — | — | 30.5 | 12.1 | 211.3 | 3.7 | 18.6 |
| 21 | 60.8 | 0.5 | 158.3 | 169.3 | 174.8 | — | — | 44.7 | 29.0 | 218.2 | 4.1 | 13.6 |
| 22 | 60.4 | 0.5 | 158.0 | 169.3 | 174.7 | — | — | 45.5 | 30.4 | 217.8 | 2.3 | 12.7 |
| 23 | 60.2 | 0.5 | 157.8 | 169.3 | 174.4 | — | — | 46.5 | 29.6 | 218.2 | 3.2 | 11.8 |
| 24 | 58.8 | 0.5 | 157.8 | — | 175.1 | — | 193.4 | 23.1 | 28.4 | — | — | — |
| 25 | 57.9 | 0.5 | 157.2 | — | 174.3 | — | 192.6 | 26.4 | 29.0 | — | — | — |

$\Delta H_f^{cc}$—enthalpy of cold crystallization
$T_g$—glass transition temperature
$\Delta H_f^\alpha$—enthalpy of melting of α-crystallinity
$T_m$—melt temperature
$\Delta H_f^{sc}$—enthalpy of melting of stereocomplex crystallinity

Example 11

Samples of low and medium molecular weight PDLA were blended with various low, medium or high molecular weight PLLA samples with a D-lactide content 1%. The amount of PDLA in the blended samples was 15%, 37.5% or 50% by weight. These blends were injection moulded to give plaque samples of approximately 1.4 mm thickness. Each of the plaque samples was then stretched using a Karo IV Stretcher under standard stretching conditions at 85° C., to a draw ratio of 3.5×3.5, 4×4 or 5×5. The stretched samples were subse-

TABLE 18

| Sample | | | | After Annealing at 110° C. | | | | | |
|---|---|---|---|---|---|---|---|---|---|
| Type | Weight % | Type | Draw | | | | 45° | Shrinkage % | |
| PDLA | PDLA | PLLA | Ratio | Trans | Haze | Clarity | Gloss | 80° C. | 120° C. |
| LMW | 15 | LMW | 4 × 4 | 95.2 | 2.2 | 98.9 | 85.4 | 0.7 | 6.0 |
| LMW | 37.5 | LMW | 4 × 4 | 95.2 | 1.3 | 99.2 | 88.2 | 0.8 | 6.8 |
| LMW | 50 | LMW | 4 × 4 | 95.3 | 1.4 | 98.7 | 88.2 | 0.6 | 2.0 |
| LMW | 50 | LMW | 5 × 5 | 95.2 | 0.8 | 99.2 | 88.6 | 0.6 | 3.3 |
| LMW | 15 | MMW | 4 × 4 | 95.2 | 1.6 | 99.1 | 87.6 | 0.8 | 12.8 |
| LMW | 37.5 | MMW | 4 × 4 | 95.2 | 0.8 | 99.6 | 87.8 | 0.8 | 7.0 |
| LMW | 50 | MMW | 4 × 4 | 95.2 | 1.3 | 98.9 | 88.2 | 1.1 | 3.3 |
| LMW | 50 | MMW | 4.5 × 4.5 | 95.1 | 0.7 | 98.8 | 88.0 | 0.6 | 4.2 |
| LMW | 15 | HMW | 3.5 × 3.5 | 94.8 | 2.3 | 99.1 | 90.4 | 0.9 | 14.9 |
| LMW | 37.5 | HMW | 4 × 4 | 95.1 | 1.2 | 98.6 | 88.0 | 1.7 | 13.8 |
| LMW | 50 | HMW | 4 × 4 | 94.8 | 2.7 | 87.6 | 84.7 | 0.3 | 1.6 |
| MMW | 15 | LMW | 4 × 4 | 95.1 | 2.0 | 97.4 | 83.6 | 0.8 | 7.0 |
| MMW | 37.5 | LMW | 4 × 4 | 95.1 | 1.6 | 98.3 | 86.2 | 0.8 | 5.6 |
| MMW | 50 | LMW | 4 × 4 | 95.2 | 1.1 | 98.0 | 87.3 | 0.9 | 6.7 |
| MMW | 15 | MMW | 4 × 4 | 95.2 | 1.5 | 99.6 | 87.5 | 1.4 | 14.8 |
| MMW | 37.5 | MMW | 4 × 4 | 95.1 | 0.5 | 99.7 | 89.3 | 1.1 | 11.6 |
| MMW | 50 | MMW | 4 × 4 | 95.2 | 0.8 | 99.5 | 88.8 | 0.4 | 10.1 |
| MMW | 37.5 | HMW | 4 × 4 | 95.0 | 1.1 | 99.2 | 88.8 | — | 16.9 |
| MMW | 50 | HMW | 4 × 4 | 95.1 | 0.7 | 97.7 | 84.4 | 1.8 | 12.1 |

LMW—low molecular weight
MMW—medium molecular weight
HMW—high molecular weight

TABLE 19

| Sample | | | | After Annealing at 180° C. | | | | | | | |
|---|---|---|---|---|---|---|---|---|---|---|---|
| | | | | | | | 45° | Shrinkage % | | | |
| Type | Weight % | Type | Draw | Trans | Haze | Clarity | Gloss | 80° C. | 120° C. | 150° C. | 180° C. |
| PDLA | PDLA | PLLA | Ratio | | | | | | | | |
| LMW | 15 | LMW | 4 × 4 | 94.9 | 2.1 | 97.4 | 87.0 | 0.5 | 1.2 | 2.9 | 6.3 |
| LMW | 37.5 | LMW | 4 × 4 | 95.0 | 1.9 | 97.6 | 86.7 | 0.4 | 0.9 | 1.2 | 1.4 |
| LMW | 50 | LMW | 4 × 4 | 95.2 | 0.9 | 99.0 | 89.7 | 0.7 | 1.0 | 0.9 | 1.5 |
| LMW | 50 | LMW | 5 × 5 | 95.0 | 1.1 | 98.8 | 88.3 | 0.5 | 0.6 | 0.3 | 1.6 |
| LMW | 15 | MMW | 4 × 4 | 94.9 | 2.1 | 97.7 | 87.7 | 0.6 | 2.0 | 4.7 | 9.0 |
| LMW | 37.5 | MMW | 4 × 4 | 94.9 | 1.0 | 99.5 | 90.8 | 0.5 | 1.0 | 1.5 | 2.2 |
| LMW | 50 | MMW | 4 × 4 | 95.1 | 2.2 | 98.3 | 89.7 | 0.4 | 0.9 | 1.1 | 2.3 |
| LMW | 50 | MMW | 4.5 × 4.5 | 95.2 | 0.8 | 99.0 | 86.3 | 0.5 | 0.3 | 2.6 | 1.0 |
| LMW | 15 | HMW | 3.5 × 3.5 | 94.4 | 2.9 | 97.1 | 81.5 | 0.0 | 0.7 | 2.5 | 3.8 |
| LMW | 37.5 | HMW | 4 × 4 | 94.9 | 1.9 | 98.8 | 90.1 | 0.6 | 1.0 | 1.2 | 3.4 |
| LMW | 50 | HMW | 4 × 4 | 94.9 | 2.1 | 92.3 | 87.3 | 0.4 | 0.8 | 1.1 | 1.4 |
| MMW | 15 | LMW | 4 × 4 | 94.8 | 2.0 | 95.1 | 81.7 | 0.4 | 1.2 | 1.7 | 7.9 |
| MMW | 37.5 | LMW | 4 × 4 | 94.7 | 2.8 | 96.0 | 86.9 | 0.5 | 0.8 | 1.2 | 2.0 |
| MMW | 50 | LMW | 4 × 4 | 95.0 | 1.3 | 98.1 | 89.8 | 0.3 | 1.2 | 0.9 | 1.4 |
| MMW | 15 | MMW | 4 × 4 | 94.9 | 1.8 | 97.2 | 88.2 | 2.0 | 2.1 | 3.8 | 8.1 |
| MMW | 37.5 | MMW | 4 × 4 | 94.8 | 1.2 | 99.0 | 89.4 | 0.5 | 1.4 | 7.2 | 2.7 |
| MMW | 50 | MMW | 4 × 4 | 94.9 | 0.6 | 99.3 | 92.1 | 0.3 | 0.9 | 1.1 | 2.0 |
| MMW | 37.5 | HMW | 4 × 4 | 94.9 | 2.3 | 98.8 | 88.8 | 0.6 | 2.1 | 2.3 | 5.0 |
| MMW | 50 | HMW | 4 × 4 | 94.9 | 1.5 | 97.7 | 88.9 | 0.4 | 1.2 | 1.4 | 7.8 |

LMW—low molecular weight
MMW—medium molecular weight
HMW—high molecular weight

TABLE 20

| Sample | | | | | Average Results from Multiple Draw Curves | | | | | |
|---|---|---|---|---|---|---|---|---|---|---|
| | | | | Initial Yield | | Initial Yield Force | | Minimum Yield | Maximum Draw Force | | Preheat Time |
| Type | Weight % | Type | Draw | Initial Yield | | Force | | Yield | Draw Force | | Time |
| PDLA | PDLA | PLLA | Ratio | Draw Ratio | Max | Min | Draw Ratio | Max | Min | (s) |
| LMW | 15 | LMW | 4 × 4 | 2 | 22.9 | 21 | 3.4 | 22.2 | 19.9 | 40 |
| LMW | 37.5 | LMW | 4 × 4 | 2 | 20.4 | 19.3 | 3.5 | 17.5 | 15 | 40 |
| LMW | 50 | LMW | 4 × 4 | 1.8 | 17.5 | 15.5 | 3.7 | 12.1 | 9.6 | 40 |
| LMW | 50 | LMW | 5 × 5 | 1.8 | 16.5 | 15.2 | 3.95 | 15.2 | 12.1 | 40 |
| LMW | 15 | MMW | 4 × 4 | 2.1 | 26.2 | 24.4 | 3.1 | 34.6 | 33.2 | 40 |
| LMW | 37.5 | MMW | 4 × 4 | 2.1 | 22.7 | 20.8 | 3.3 | 25.9 | 22.7 | 40 |
| LMW | 50 | MMW | 4 × 4 | 1.8 | 19.1 | 17.7 | 3.55 | 17 | 13.1 | 40 |
| LMW | 50 | MMW | 4.5 × 4.5 | 1.9 | 19 | 17.5 | 3.5 | 21 | 16.3 | 40 |
| LMW | 15 | HMW | 3.5 × 3.5 | 2.1 | 30 | 37.4 | 2.8 | 48.3 | 36.5 | 40 |
| LMW | 37.5 | HMW | 4 × 4 | 2.1 | 24.7 | 23 | 3.1 | 41 | 34.4 | 40 |
| LMW | 50 | HMW | 4 × 4 | 1.9 | 17 | 18.7 | 3.4 | 17.6 | 15.5 | 40 |
| MMW | 15 | LMW | 4 × 4 | 2 | 23.1 | 21.6 | 3.3 | 24 | 21.6 | 40 |
| MMW | 37.5 | LMW | 4 × 4 | 2 | 23.1 | 21 | 3.3 | 24.5 | 22.3 | 40 |
| MMW | 50 | LMW | 4 × 4 | 2 | 22.4 | 20.1 | 3.3 | 24.2 | 22.2 | 40 |
| MMW | 15 | MMW | 4 × 4 | 2.1 | 26.6 | 25 | 3 | 42.9 | 37 | 40 |
| MMW | 37.5 | MMW | 4 × 4 | 2 | 25 | 23.2 | 3.1 | 34.4 | 29.3 | 40 |
| MMW | 50 | MMW | 4 × 4 | 2 | 23.8 | 21.5 | 3.2 | 31.4 | 28 | 40 |
| MMW | 37.5 | HMW | 4 × 4 | 2.1 | 26.5 | 25.2 | 3 | 59.7 | 45.5 | 40 |
| MMW | 50 | HMW | 4 × 4 | 2.1 | 25.5 | 22.7 | 3.1 | 41.2 | 34.2 | 40 |

LMW—low molecular weight
MMW—medium molecular weight
HMW—high molecular weight

From the results in Tables 18, 19 and 20 it can be seen that all of the samples tested form heat stable, optically clear stereocomplexed films. All of the film samples show similar properties, low shrinkages and good optical properties, even when the amount of PDLA present in the sample is as low as 15% by weight. Reducing the amount of PDLA present in the film may provide large economical benefits.

Example 12

The following film samples were produced by injection moulding following by stretching using a Karo IV Stretcher under standard conditions. The samples were then annealed at 110° C. or 190° for 60 seconds.

| Anneal Temperature (° C.) | Draw Ratio | Type of PLLA and PDLA in used (ratio 1:1) |
|---|---|---|
| 110 | 5 × 5 | L95 + D99 |
| | 6 × 6 | L95 + D99 |
| | 4 × 4 | L99 + D99 |
| | 5 × 5 | L99 + D99 |
| | 6 × 6 | L99 + D99 |

-continued

| Anneal Temperature (° C.) | Draw Ratio | Type of PLLA and PDLA in used (ratio 1:1) |
|---|---|---|
| 190 | 5 × 5 | L95 + D99 |
|  | 6 × 6 | L95 + D99 |
|  | 4 × 4 | L99 + D99 |
|  | 5 × 5 | L99 + D99 |
|  | 6 × 6 | L99 + D99 |

After the film samples were annealed, they were analysed for shrinkage and stiffness using dynamic mechanical analysis.

Dynamic mechanical analysis involved a strip of the film sample of approximately 5 mm width being held between two vertical clamps separated by a distance of 20 mm (±0.05 mm). The base clamp was supported on an air bearing and was free to move with the motion of the sample. The length of the clamped film sample was measured at this point. Subsequently, the film sample was encased in a furnace and heated from 23° C. to 200° C. at a rate of 2° C. min$^{-1}$, and length measurements were taken periodically.

The graph in FIG. 8 shows the shrinkage of the ten film samples as determined by dynamic mechanical analysis. Shrinkage is inferred by the displacement of the sample as a function of temperature, which is observed as a percentage of the original sample length. The dashed lines show the shrinkage of the samples after being annealed at 190° C. and the solid lines show the shrinkage of the samples after being annealed at 110° C.

From the graph in FIG. 8 it can be seen that annealing at 190° C. has left amorphous phase PLA within the samples. However, stress-relaxation may have significantly reduced amorphous orientation, which leads to less shrinkage at the $T_g$.

A temperature of 190° C. is above the α-crystallinity melt region of stereospecific PLA. This may help to explain the observed reduction in shrinkage over this range when compared to samples annealed at 110° C. However, at temperatures above 180° C. the shrinkage between the samples annealed at 110° C. and 190° C. is more relative. It is possible that conversion of α-crystalline PLLA and PDLA to stereocomplex crystallinity has occurred by this point, thus, causing shrinkage through the stereocomplex melt.

Example 13

Trials were run on a Pilot Stenter machine with the extruder and die set to extrude the sample blends at 240° C. Each sample was then quenched on a chill roller. Following this, each sample was heated up to a temperature between 55° C. and 65° C. before being drawn in the machine direction (to a draw ratio of approximately 3) and was then further heated to a temperature between 75° C. and 100° C. before being drawn in the transverse direction (to a draw ratio of approximately 3 or 3.5).

Each sample was then annealed at temperatures between 110° C. and 120° C. and subsequently annealed at 190° C. or 210° C. for 60 seconds.

The sample compositions are outlined in the table below:

| Sample No. | PLLA | Amount PLLA (Weight %) | PDLA | Amount PDLA (Weight %) | Stretch Ratio |
|---|---|---|---|---|---|
| 26 | Natureworks N3001 | 50 | Purac D1510 | 50 | 3 × 3 |
| 27 | Purac L91 + Purac 1510 | 15 + 60 | Purac D1510 | 25 | 3 × 3.5 |
| 28 | Purac L91 + Purac 1510 | 17.5 + 70 | Purac D1510 | 12.5 | 3 × 3 |

Table 21 shows the optical properties of the film samples after annealing on the machine at a temperature of between 110° C. to 120° C.

TABLE 21

| Sample No. | Optics | | | | | | |
|---|---|---|---|---|---|---|---|
|  | 45° Gloss | WAH | NAH Low | NAH High | Colour l | Colour a | Colour b |
| 26 | 88.7 | 1.1 | 0.5 | 4.1 | 97.239 | 0.012 | 0.153 |
| 27 | 90.4 | 0.6 | 0.4 | 2.3 | 97.256 | 0.006 | 0.144 |
| 28 | 88.7 | 1.7 | 0.4 | 5.4 | 97.188 | 0.007 | 0.116 |

Table 22 shows the shrinkage properties of the film samples after annealing on the machine at a temperature of between 110° C. to 120° C.

TABLE 22

| Sample No. | Shrinkages | | | | | | Thickness (μm) |
|---|---|---|---|---|---|---|---|
|  | MD 80° C. | MD 120° C. | MD 150° C. | TD 80° C. | TD 120° C. | TD 150° C. |  |
| 26 | 3.85 | 14.90 | 19.63 | 6.25 | 25.70 | 32.69 | 64.5 |
| 27 | 3.13 | 16.36 | 24.17 | 0.33 | 10.58 | 18.29 | 41.6 |
| 28 | 2.94 | 16.69 | 26.83 | 1.08 | 13.43 | 23.38 | 49.8 |

Table 23 shows the tensile properties of the film samples in the machine direction, after annealing on the machine at a temperature of between 110° C. to 120° C.

TABLE 23

| Sample No. | Tensiles - MD | | | | |
|---|---|---|---|---|---|
| | Ten Str (Mpa) | Ext (%) | Pk Load (N) | Secant (Mpa) | Youngs (Mpa) |
| 26 | 80.3 | 125.8 | 134.3 | 3062 | 3127 |
| 27 | 96.7 | 100.4 | 105.9 | 3531 | 3595 |
| 28 | 98.8 | 98.4 | 120.8 | 3573 | 3638 |

Table 24 shows the tensile properties of the film samples in the transverse direction, after annealing on the machine at a temperature of between 110° C. to 120° C.

TABLE 24

| Sample No. | Tensiles - TD | | | | |
|---|---|---|---|---|---|
| | Ten Str (Mpa) | Ext (%) | Pk Load (N) | Secant (Mpa) | Youngs (Mpa) |
| 26 | 178.0 | 40.5 | 258.9 | 5362 | 5463 |
| 27 | 139.0 | 65.3 | 145.9 | 4806 | 4925 |
| 28 | 140.0 | 70.5 | 162.2 | 4499 | 4608 |

Table 25 shows the tear properties of the film samples in the machine and transverse directions, after annealing on the machine at a temperature of between 110° C. to 120° C.

TABLE 25

| Sample No. | Tear - MD | | Tear - TD | |
|---|---|---|---|---|
| | Average Load (N) | Max Load (N) | Average Load (N) | Max Load (N) |
| 26 | 0.038 | 0.364 | 0.063 | 0.403 |
| 27 | 0.085 | 0.472 | 0.059 | 0.443 |
| 28 | 0.105 | 0.370 | 0.076 | 0.446 |

Table 26 shows the Gurley Stiffness of the film samples after annealing on the machine at a temperature of between 110° C. to 120° C.

TABLE 26

| Sample No. | Gurley Stiffness | | | |
|---|---|---|---|---|
| | MD | | TD | |
| | Stiffness | Thickness | Stiffness | Thickness |
| 26 | 30.358 | 56.5 | — | — |
| 27 | 18.348 | 41.2 | 21.740 | 43.9 |
| 28 | 17.347 | 44.5 | 31.247 | 53.2 |

Table 27 shows the optical properties of the film samples after annealing on the machine at a temperature of 190° C. for 60 seconds.

TABLE 27

| Sample No. | Optics | | | | | | |
|---|---|---|---|---|---|---|---|
| | 45° Gloss | WAH | NAH Low | NAH High | Colour l | Colour a | Colour b |
| 26 | 88.5 | 2.2 | 2.1 | 7.7 | 97.118 | 0.001 | 0.176 |
| 27 | 86.3 | 1.5 | 1.2 | 3.5 | 97.206 | 0.005 | 0.165 |
| 28 | 86.1 | 1.6 | 0.7 | 3.0 | 97.122 | 0.009 | 0.225 |

Table 28 shows the shrinkage properties of the film samples after annealing on the machine at a temperature of 190° C. for 60 seconds.

TABLE 28

| Sample No. | Shrinkages | | | | | | | | Thickness (μm) |
|---|---|---|---|---|---|---|---|---|---|
| | MD | | | | TD | | | | |
| | 80° C. | 120° C. | 150° C. | 180° C. | 80° C. | 120° C. | 150° C. | 180° C. | |
| 26 | 0.72 | 1.00 | 0.99 | 1.43 | 1.26 | 1.07 | 1.25 | 3.04 | 57.2 |
| 27 | 0.75 | 1.66 | 1.94 | 1.66 | 0.59 | 0.64 | 1.63 | 2.28 | 41.0 |
| 28 | 0.67 | 1.93 | 2.43 | 3.02 | 0.76 | 0.08 | −0.17 | 3.72 | 46.8 |

Table 29 shows the optical properties of the film samples after annealing on the machine at a temperature of 210° C. for 60 seconds.

TABLE 29

| Sample No. | Optics | | | | | | |
|---|---|---|---|---|---|---|---|
| | 45° Gloss | Haze | NAH Low | NAH High | l | a | b |
| 26 | 87.3 | 1.8 | 0.6 | 4.0 | 97.141 | 0.011 | 0.204 |
| 27 | 82.6 | 2.7 | 1.6 | 3.7 | 97.144 | 0.018 | 0.179 |
| 28 | 87.1 | 1.6 | 2.4 | 7.5 | 97.107 | 0.012 | 0.231 |

Table 30 shows the shrinkage properties of the film samples after annealing on the machine at a temperature of 210° C. for 60 seconds.

TABLE 30

| Sample No. | Shrinkages | | | | | | | | Thickness (μm) |
|---|---|---|---|---|---|---|---|---|---|
| | MD | | | | TD | | | | |
| | 80° C. | 120° C. | 150° C. | 180° C. | 80° C. | 120° C. | 150° C. | 180° C. | |
| 26 | 0.58 | 1.08 | 1.25 | 1.34 | 0.80 | 1.17 | 1.26 | 1.17 | 61.6 |
| 27 | 0.83 | 1.34 | 1.25 | 1.50 | 1.01 | 0.51 | −0.51 | −0.51 | 41.5 |
| 28 | 0.84 | 1.26 | 1.76 | 1.93 | 0.67 | 1.51 | 1.60 | 0.76 | 53.7 |

The results shown in Tables 21 to 30 show that it is possible to produce highly heat-stable (i.e. low shrinkage) PLA films which also have good optical properties, on an industrial scale.

Furthermore, it has been shown that it may be possible to generate a heat-stable PLA film with good optical properties, with as little as 12.5% PDLA in the blend.

Example 14

Trials were run on a Pilot Stenter machine with the extruder and die set to extrude the sample blends at 240° C. Each sample was then quenched on a chill roller. Following this, each sample was heated up to a temperature between 55° C. and 65° C. before being drawn in the machine direction (to a draw ratio of 3) and then further heated to a temperature between 75° C. and 100° C. before being drawn in the transverse direction (to a draw ratio of 3).

Each sample was then annealed at a temperature between 110° C. and 210° C. for 60 seconds using a laboratory Tenter frame.

The sample compositions are outlined in the table below:

| Sample No. | PLLA | PDLA | Ratio PLLA:PDLA | Annealing Temperature (° C.) |
|---|---|---|---|---|
| 29 | Natureworks N3001 | Purac D1510 | 1:1 | 110 |
| 30 | Natureworks N3001 | Purac D1510 | 1:1 | 150 |
| 31 | Natureworks N3001 | Purac D1510 | 1:1 | 170 |
| 32 | Natureworks N3001 | Purac D1510 | 1:1 | 190 |
| 33 | Natureworks N3001 | Pura D1510 | 1:1 | 210 |

-continued

| Sample No. | PLLA | PDLA | Ratio PLLA:PDLA | Annealing Temperature (° C.) |
|---|---|---|---|---|
| 34 | Natureworks N3001 | Pura D1510 | 1:1 | None |

Shrinkage properties of the resultant films were recorded using dynamic mechanical analysis. Crystallisation properties of the resultant films were recorded using differential scanning calorimetry.

Table 31 shows the crystallisation properties of samples 29 to 34.

TABLE 31

| Sample No. | $T_{cc}^1$ (° C.) | $\Delta H_{cc}^1$ (J/g) | $T_m1$ (° C.) | $T_m2$ (° C.) | $\Delta H_f^\alpha$ (J/g) | $T_{cc}^2$ (° C.) | $\Delta H_{cc}^2$ (J/g) | $T_m^{sc}$ (° C.) | $\Delta H_f^{sc}$ (J/g) |
|---|---|---|---|---|---|---|---|---|---|
| 29 | 126.5 | 7.5 | 163.6 | 173.1 | 17.1 | 192.2 | 9.3 | 219.0 | 39.7 |
| 30 | 136.4* | 3.9* | 163.5 | 173.0 | 18.0 | 192.2 | 9.5 | 218.0 | 38.4 |
| 31 | — | — | 163.2 | 172.6 | 23.2 | 191.7 | 8.5 | 217.4 | 39.7 |
| 32 | 102.9 | 2.3 | 164.0 | 172.3 | 21.7 | 194.0 | 7.7 | 217.9 | 39.4 |
| 33 | 104.5 | 2.5 | 163.1 | 173.3 | 21.8 | 193.8 | 7.1 | 217.5 | 39.1 |
| 34 | 124.9 | 4.8 | 162.3 | 172.1 | 21.7 | 191.7 | 9.8 | 217.9 | 39.1 |

The peak and enthalpy marked with * were only present in one replicate
$T_{cc}^1$ Initial cold crystallisation temperature
$\Delta H_{cc}^1$ Enthalpy of initial cold crystallisation
$T_m$ Melt temperature
$\Delta H_f^\alpha$ Enthalpy of melting for the alpha-polymorph
$T_{cc}^2$ Crystallisation temperature associated with alpha to stereo-complex conversion
$\Delta H_{cc}^2$ Enthalpy of alpha to stereo-complex conversion
$T_m^{sc}$ Melting temperature of stereo-complex
$\Delta H_f^{sc}$ Enthalpy of melting associated with stereo-complex The glass transition temperature ($T_g$) and the change in heat capacity ($\Delta C_p$) for samples 29 to 34 were also determined using differential scanning calorimetry. The results are shown in Table 32.

TABLE 32

| Sample No. | $T_g$ (° C.) | $\Delta C_p$ (J/g °C.) |
|---|---|---|
| 29 | 63.5 | 0.05 |
| 30 | 62.5 | 0.04 |
| 31 | 61.7 | 0.05 |
| 32 | 62.3 | 0.15 |
| 33 | 61.5 | 0.19 |
| 34 | 63.4 | 0.10 |

To determine the shrinkage of the film samples using dynamic mechanical analysis, a strip of the film of approximately 20 mm in length and 5 mm in width was heated at a rate of 2° C. $\min^d$ from 23° C. to 250° C., with a thickness-dependant preload force applied.

FIG. 9 shows shrinkage of the film samples in the machine direction. A negative displacement equates to shrinkage.

FIG. 10 shows shrinkage of the film samples in the transverse direction. Again, negative displacement equates to shrinkage.

From the results it can be seen that the film sample which was not annealed (Sample 34), shows high shrinkages at low temperatures. As the samples are annealed to progressively higher temperatures, the amount of shrinkage observed is reduced.

Since all of the samples survive heating above the melting point of the α-crystalline material, it can be concluded that all of the samples contain stereocomplexed material or material which can be rapidly converted to stereocomplex material. This is further supported by the presence of the stereocomplexed PLA peak at around 215° C.-220° C. in the DSC results.

The small cold crystallisation peak may indicate that very little further crystallinity can be induced in the samples. This may suggest that the formulation and draw has produced close to the maximum possible crystallinity in these samples.

The only sample which does not exhibit cold crystallisation prior to the first melting peak is the film annealed at 170° C. (Sample 31). The annealing temperature of 170° C. is close to the melt temperature of α-PLA which may have caused the maximum amount of α-PLA to form and thus, no further crystallinity can be imparted on the film. Sample 31 has the highest enthalpy of fusion for the α-melt peak, which supports this theory.

All of the samples exhibit a doublet-melt associated with α-PLA at approximately 164° C. and 170° C. Following the melt of the α-material, the samples all exhibit some further crystallisation. This may indicate that some of the molten α-material is able to re-orientate and associate to produce stereocomplex crystallinity.

Examples 15 to 20

Starting materials designated L99 (PLA copolymer containing L-lactide (99%) and D-lactide in its monomeric composition in an amount of 1 mol % by weight) and D99 (PLA copolymer containing 99% D-lactide and 1% L-lactide) were blended together in a 1:1 ratio and then extruded at a temperature of 250° C. to 260° C. to form a plaque which was immediately quenched by running water at a temperature of 30° C. to 40° C. to prevent the onset of crystal formation in the plaque.

Subsequently the plaque was reheated to a temperature of from 70° C. to 75° C. and then was simultaneously drawn at 7.6 m/min in both its transverse and longitudinal directions to 4.5 times its original dimensions in both directions (i.e. an area draw of 20.25).

The resulting simultaneously stretched and oriented crystalline film was then heat set initially at 110° C. for 10 seconds. The resulting film comprising both α- and stereocomplex crystallinity acted as a control (comparative example). Secondary heat setting of the material in a restrain frame at either 190 or 210° C. for the time described below produced films in accordance with the invention—Examples 15 to 20 below (secondary annealing time starts when the sample is placed in the oven).

TABLE 33

| Anneal Temperature | Anneal Time (S) | 45° Gloss | Haze-Gard Haze | Haze-Gard Clarity | Thickness (micron) | Shrinkages % (MD) 80° C. | Shrinkages % (MD) 120° C. | Shrinkages % (MD) 150° C. |
|---|---|---|---|---|---|---|---|---|
| Control (110) | 10 | 89.8 | 0.7 | 98.2 | 91.5 | 2.9 | 16.7 | 23.2 |
| 190 (Ex. 15) | 10 | 90.4 | 0.6 | 97.9 | 84.6 | 0.9 | 1.9 | 5.3 |
| (Ex. 16) | 30 | 91.4 | 0.6 | 97.3 | 86.8 | 0.9 | 1.6 | 2.5 |
| (Ex. 17) | 60 | 91.4 | 0.6 | 97.4 | 86.6 | 0.7 | 1.4 | 2.5 |
| 210 (Ex. 18) | 10 | 90.1 | 0.5 | 97.4 | 84.2 | 1.1 | 1.4 | 2.7 |
| (Ex. 19) | 30 | 91.1 | 0.5 | 97.1 | 84.1 | 0.7 | 1.2 | 2.0 |
| (Ex. 20) | 60 | 91.2 | 0.5 | 96.8 | 92.9 | 0.7 | 1.1 | 1.4 |

As can be seen, a substantial reduction in film shrinkage has been achieved vs. the control, low temperature annealed sample. Good optical properties have also been maintained.

The invention claimed is:

1. A transparent, dimensionally stable, oriented PLA film having a haze value of less than 3% and exhibiting strain induced crystallinity in the form of a stereocomplex of crystalline PLLA and PDLA having been oriented from a substantially non-crystalline state by stretching the film by more than three times its original areal dimensions.

2. The film according to claim 1, wherein the film is biaxially oriented by simultaneous stretching in each of the transverse and longitudinal directions.

3. The film according to claim 1, wherein the film is biaxially oriented by sequential stretching in each of the transverse and longitudinal directions.

4. The film according to claim 1, wherein the film is monoaxially oriented.

5. The film according to claim 1, wherein the film has a haze value of less than 2.5.

6. The film according to claim 1, wherein the film has a clarity of at least about 95%.

7. The film according to claim 1, wherein the film is oriented by stretching the film by at least four times its original dimensions simultaneously in each of the transverse and longitudinal directions.

8. The film according to claim 1, wherein the film exhibits a longitudinal (machine direction) shrinkage and/or transverse direction shrinkage of less than 2% at 80° C.

9. The film according to claim 1, wherein the film exhibits a longitudinal (machine direction) shrinkage and/or transverse direction shrinkage of less than 5% at 120° C.

10. The film according to claim 1, wherein the film exhibits a longitudinal (machine direction) shrinkage and/or transverse direction shrinkage of less than 10% at 150° C.

11. The film according to claim 1, wherein the film exhibits a longitudinal (machine direction) shrinkage and/or transverse direction shrinkage of less than 20% at 180° C.

12. The film according to claim 1, comprising crystallinity in the form of a stereocomplex of crystalline PLLA and PDLA formed during annealing of the film.

13. The film according to claim 1, wherein α-form crystals of PLLA and/or PDLA are present in the film.

14. The film according to claim 13, wherein any such α-form crystals are present in the film in amounts of less than 30% of the amount of stereo complex present.

15. A process for the manufacture of the film according to claim 1, comprising the steps of:
   a. extruding a blend of a first PLA rich in L-lactate repeat units (optionally PLLA itself) and a second PLA rich in D-lactate repeat units (optionally PDLA itself) at a temperature of at least about 220° C. to provide an extrudate;
   b. quenching the extrude directly after extrusion to a temperature below about 65° C. to hinder or prevent crystal formation in the extrudate;
   c. reheating the quenched extrudate to a temperature of at least about 65° C. and subsequently immediately stretching the film to more than three times its original area to introduce orientation and crystallinity into the film, crystallinity being in the form of a stereocomplex of PLLA and PDLA, and optionally in the α-crystalline form; and
   d. heat setting the stretched and oriented crystalline film at a temperature of at least about 170° C. to melt out at least a proportion of any α-crystallinity in the film and optionally introduce further stereocomplex crystallinity into the film.

16. The process according to claim 15, wherein the film is stretched in step c) at a draw rate of greater than 150 μm/s in at least one of its machine and transverse directions.

17. The process according to claim 15, wherein the L-lactate-rich PLA used in the blend is pure PLLA.

18. The process according to claim 15, wherein the L-lactate-rich PLA used in the blend includes a minor amount of D-lactide.

19. The process according to claim 15, wherein the D-lactate-rich PLA used in the blend is pure PDLA.

20. The process according to claim 15, wherein the D-lactate-rich PLA used in the blend includes a minor amount of L-lactide.

21. The process according to claim 15, wherein the blend of the first PLA and the second PLA comprises up to about 90% L-lactate repeat units by weight L-lactate repeat units.

22. The process according to claim 15, wherein the blend of the first PLA and the second PLA comprises up to about 90% D-lactate repeat units by weight D-lactate repeat units.

23. The process according to claim 15, wherein the first PLA and the second PLA are present in the blend in a ratio (first PLA:second PLA) of from 99:1 to 1:99.

24. The process according to claim 15, wherein the first PLA is present in an amount of at least 50% by weight of the blend.

25. The process according to claim 15, wherein the second PLA is present in an amount of 50% or less by weight of the blend.

26. The process according to claim 15, wherein the extrusion temperature is at least about 230° C.

27. The process according to claim 15, wherein the extrusion temperature is 250° C. to 260° C.

28. The process according to claim 15, wherein the quenching temperature is below about 55° C.

29. The process according to claim 15, wherein the quenching temperature is in the range of from 30° C. to 40° C.

30. The process according to claim 15, wherein the reheat temperature to which the film heated immediately prior to stretching is at least about 70° C.

31. The process according to claim 15, wherein heat setting of the film is conducted at a temperature of at least about 175° C.

32. The process according to claim 15, wherein the extrudate after quenching but before stretching is amorphous.

33. A film produced by the process of claim 15.

34. An article packaged or labelled with film of claim 1.

35. A package or label, comprising the film of claim 1.

36. The film according to claim 1, wherein the film exhibits a shrinkage in the machine direction or transverse direction of one or more of the following:
   less than 2% in the machine direction at 80° C.;
   less than 5% in the machine direction at 120° C.;
   less than 10% in the machine direction at 150° C.;
   less than 20% in the machine direction at 180° C.

* * * * *